United States Patent
Hisamatsu et al.

(10) Patent No.: US 7,295,234 B2
(45) Date of Patent: Nov. 13, 2007

(54) DC LEVEL CONTROL METHOD, CLAMP CIRCUIT, AND IMAGING APPARATUS

(75) Inventors: Yasuaki Hisamatsu, Kanagawa (JP); Tsutomu Haruta, Kanagawa (JP); Ken Koseki, Kanagawa (JP)

(73) Assignee: Sony Corporation (JP)

( * ) Notice: Subject to any disclaimer, the term of this patent is extended or adjusted under 35 U.S.C. 154(b) by 1013 days.

(21) Appl. No.: 10/443,761

(22) Filed: May 23, 2003

(65) Prior Publication Data
US 2004/0008270 A1    Jan. 15, 2004

(30) Foreign Application Priority Data
May 30, 2002   (JP)   ............... P2002-157056

(51) Int. Cl.
*H04N 5/16* (2006.01)
(52) U.S. Cl. .................... 348/257; 348/689
(58) Field of Classification Search ............. 348/222.1, 348/228.1, 229.1, 241, 243, 255, 257, 687, 348/689
See application file for complete search history.

(56) References Cited

U.S. PATENT DOCUMENTS

| | | | | |
|---|---|---|---|---|
| 4,811,016 | A * | 3/1989 | Millward et al. | 341/126 |
| 5,497,403 | A * | 3/1996 | Harada et al. | 375/345 |
| 5,532,758 | A * | 7/1996 | Honma | 348/694 |
| 6,580,465 | B1 * | 6/2003 | Sato | 348/689 |
| 6,587,144 | B1 * | 7/2003 | Kim | 348/241 |
| 6,753,913 | B1 * | 6/2004 | Bilhan et al. | 348/241 |
| 6,791,607 | B1 * | 9/2004 | Bilhan et al. | 348/243 |
| 2002/0118127 | A1 * | 8/2002 | Ahn et al. | 341/139 |
| 2003/0133627 | A1 * | 7/2003 | Brehmer et al. | 382/308 |
| 2003/0202111 | A1 * | 10/2003 | Park | 348/243 |
| 2003/0214688 | A1 | 11/2003 | Koseki et al. | |

FOREIGN PATENT DOCUMENTS

JP    07-162713    *    6/1995

OTHER PUBLICATIONS

J. Nakamura et al., "On-Focal-Plane Signal Processing for Current-Mode Active Pixel Sensors", IEEE Transactions on Election Devices, vol. 44, No. 10, Oct. 1997.

* cited by examiner

*Primary Examiner*—Lin Ye
*Assistant Examiner*—Yogesh Aggarwal
(74) *Attorney, Agent, or Firm*—Rader Fishman & Grauer PLLC; Ronald P. Kananen

(57) ABSTRACT

A dc level control method for holding a dc level of a clamp portion in an electric signal to be a prescribed value is disclosed, wherein the method comprises the steps of: comparing a dc level of a sampling interval in said electric signal with a predetermined reference value to obtain a difference between said dc level and said reference value using an A/D converting section for dc level comparison which has a lower bit resolution than an A/D converting section for digital signal processing of said electric signal; and feeding back a clamp signal to said electric signal so that said obtained difference between said dc level and said reference value substantially becomes zero. This method is suitable for applying to a signal processing system for a solid state imaging apparatus.

17 Claims, 13 Drawing Sheets

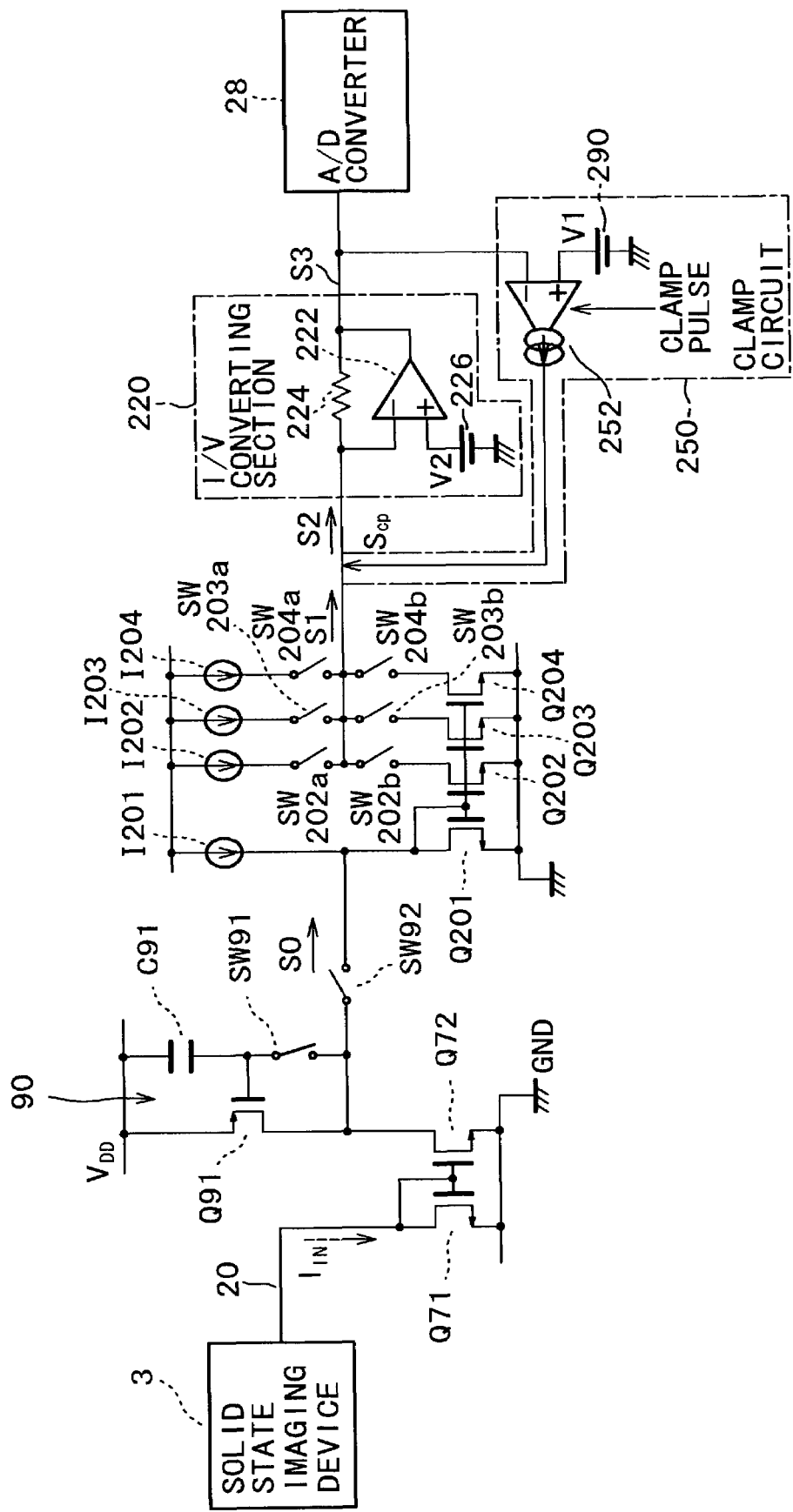

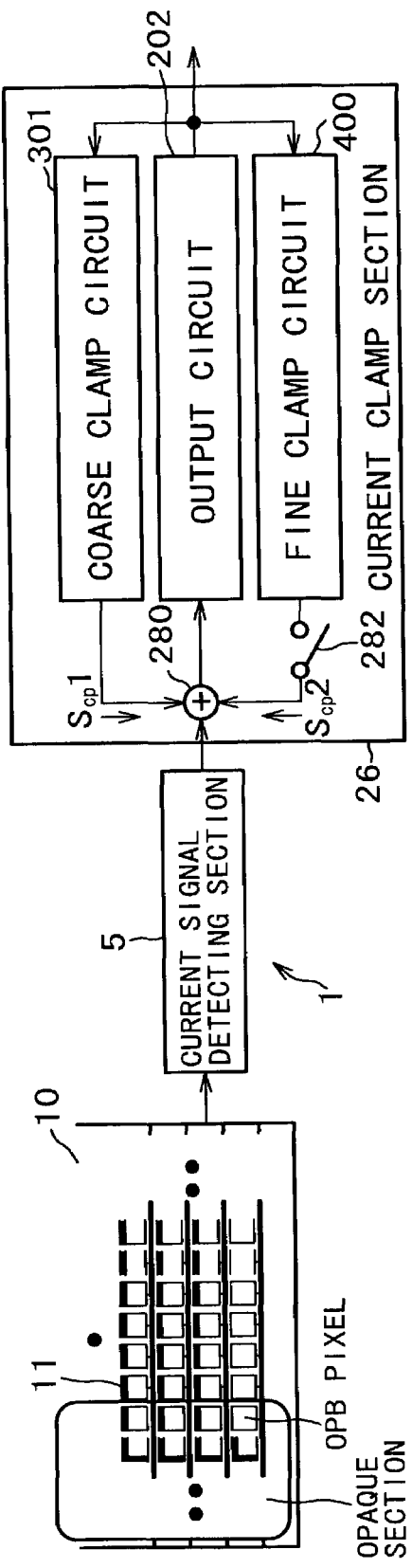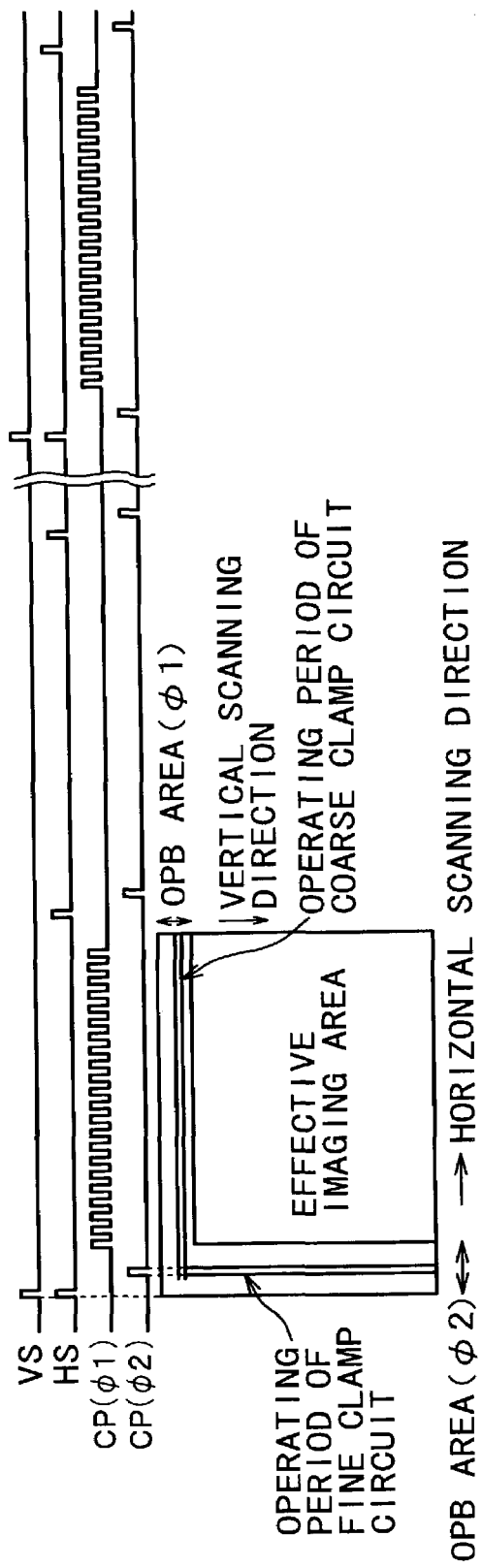

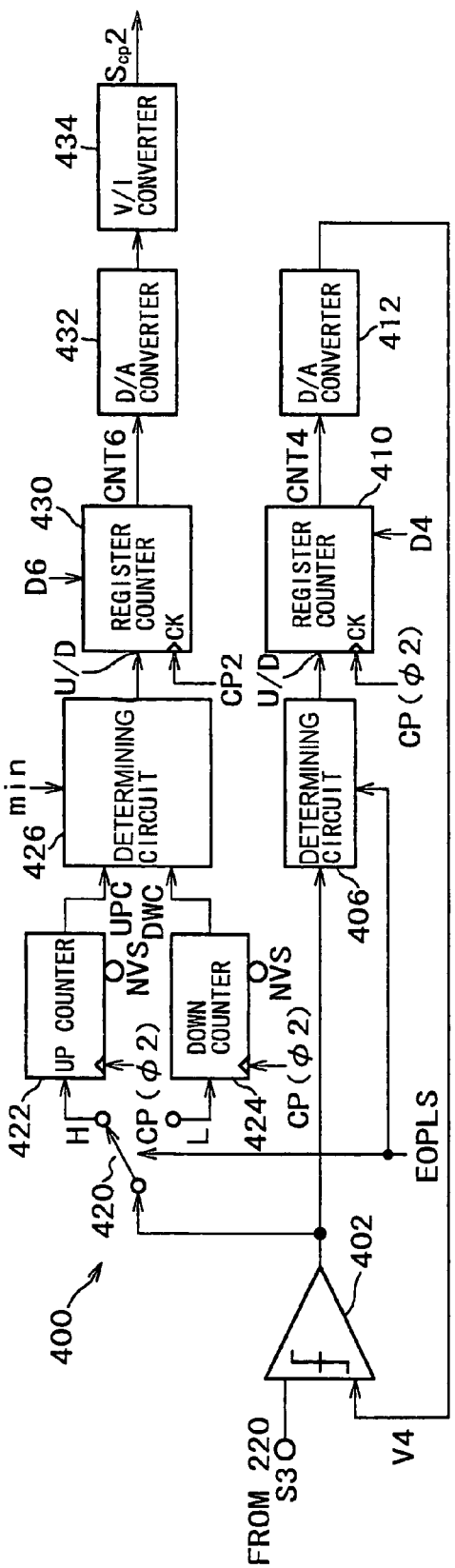
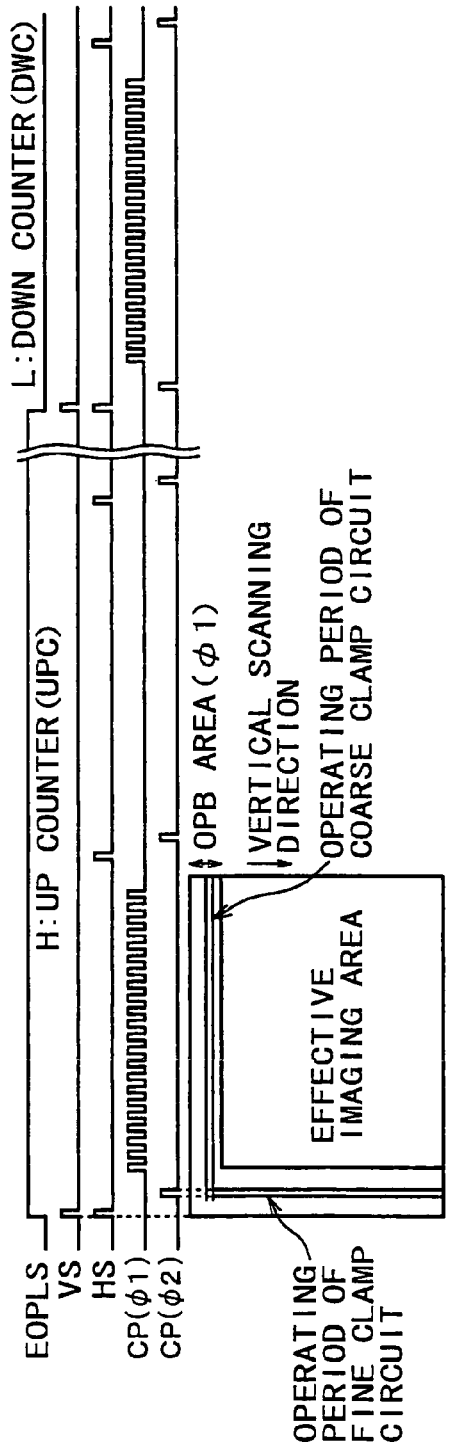
FIG. 10A
FIG. 10B

DRV=OPB LEVEL OF VOLTAGE SIGNAL S3

S344: ARR>Δ1

S344: ARR<−Δ1

S344: ARR>Δ1

S344: ARR<−Δ1

DC LEVEL CONTROL METHOD, CLAMP CIRCUIT, AND IMAGING APPARATUS

BACKGROUND OF THE INVENTION

1. Field of the Invention

The present invention relates to a DC level control method, a clamp circuit, and an imaging apparatus including the clamp circuit.

2. Description of the Related Art

When handling various electric signals including imaging signals, sometimes such handling is conducted by holding a DC level of an electric signal at a constant value. A circuit used for such purpose is called as a clamp circuit.

It is as well-known that a clamp circuit of an analog type is so configured that the clamp circuit samples an electric signal to be handled at a predetermined timing, stores a sampled level in a condenser (a storage element or a capacitor), compares the sampled level (an electric signal level at the time of sampling) with a pre-arranged reference level, and carries out a feedback operation so that a difference between the two levels will reach approximately zero.

In order to achieve a stability of the DC level in the electric signal, it is preferable to set a period of holding the sampling level to some degree of length. Further, to avoid any too sensitive reaction to noise during a period of clamp pulses, a condenser having a relatively large capacity is required as a sampling hold condenser in the analog type clamp circuit. Consequently, an external condenser is generally put to use, so that the problems remains in terms of the number of parts and mounting of parts.

For example, a clamp circuit for holding the DC level of an imaging signal outputted from a solid state imaging device to be a constant value is explained. In an imaging system using a solid state imaging device, a clamp circuit, by adjusting an OPB (Optical Black) level of an imaging signal with a reference level, prevents problems such as black floating or black sinking in the imaging signals, and realizes to secure a dynamic range of an analog circuit such as a CDS (Correlated Double Sampling) circuit.

Nevertheless, in a case where noise appears on this OPB level, there occurs a problem of noise generation in a picture image due to fluctuation of the clamp level. As a result, normally, it is so configured that the clamp circuit uses a condenser having large capacity as a device for holding the clamp level and concurrently acting as a circuit for performing the function of an LPF (Low Pass Filter), and a negative feedback is applied during the period of the clamp pulses to make the difference between the OPB level and a desired converging level as zero so that the clamp level clamped by the clamp pulse is maintained by the condenser.

However, the use of a condenser having too large capacity causes a slow response and deteriorates a picture image during a time period up to the time when the clamp level becomes stable at the time of initializing or of changing its gain, and this becomes noticeable in the picture image. Hence, such condenser is determined its capacity within a range permissible by considering a response rate. But this results, in the end, that the condenser having capacity large enough to achieve the LPF function cannot be utilized, and this causes a problem of horizontally extending noise on the screen. Furthermore, since a condenser having large capacity is unable to be mounted together with a solid state imaging device, and usually such a large condenser is treated as an external component part, so that improvement has been expected to reduce a mounting area as well as the number of parts.

On the other hand, in addition to the method of holding the analog value by the condenser to hold the clamp level, there is considered a clamp circuit of a digital type to hold the clamp level in a digital value. In this case, it is so configured that the clamp level is digitized by a multi-bit A/D converter and that a digital filter having bit redundancy or the like is used to perform digital filter processing, after that, a D/A converter is used for reconverting the digitized clamp level to the analog representation to carry out the feedback.

Nonetheless, in this case, the use of a multi-bit A/D converter and a digital filter circuit causes to enlarge the size of the circuitry. Further, there will be an increase in the digital noise level and the frequency of the noise will be relatively high, thus creating a problem of digital noise affecting the clamp circuit system.

For example, an OPB clamp of an imaging apparatus is discussed. In the case of a the digital type clamp circuit for digitally holding the OPB clamp level, it is so configured that the clamp level is digitized by a multi-bit A/D converter for signal processing to perform digital filter processing, after that digitized clamp level is again subjected to the analog representation by the D/A converter to carry out the feedback. In this case, the multi-bid A/D converter for the signal processing naturally requires a high sampling frequency, so that a frequency of the digital noise generated becomes higher. Further, because of the larger scale of the multi-bit A/D converter and the digital filter circuit, it becomes necessary to examine the extent of mounting them on the same substrate on which the solid state imaging device is mounted.

When mounting all of the A/D converter, the digital filter circuit, and the D/A converter altogether on the same substrate on which the solid state imaging device is mounted, any connection to a signal processing LSI will be made via a digital bus. However, for application such as a small module, a multi-bit digital bus requires some size of substrate area therefore, thus this makes it disadvantageous in term of substrate size. Furthermore, there is such a large amount of noise generated as to make it difficult to be employed. This is also applicable to a case of mounting only an A/D converter on the same substrate on which the solid state imaging device is mounted.

On the other hand, when all of an A/D converter, a digital filter circuit, and a D/A converter are mounted together with a signal processing LSI of the latter stage, there is a fear that digital noise is induced on an analog signal line subsequent to the D/A converter and mixed in a solid state imaging device through a feedback bus. In an digital imaging system where an A/D converter, a D/A converter, a digital filter, and a solid state imaging device are mounted together on the same substrate, it is impossible for a signal processing LSI and a solid state imaging device to be considered separately as a system. This system cannot be employed if there is a possibility of using a general-purpose product for a signal processing LSI.

In this manner as described above, a conventional clamp circuit of the digital type is designed as a combination of a clamp circuit with a multi-bit A/D converter for signal processing, or a D/A converter, and therefore, there exists a problem that a complete form of the clamp circuit is not realized yet in terms of noise and circuit arrangement.

SUMMARY OF THE INVENTION

In view of these considerations, the present invention meets a need to provide a DC level control method of the digital system capable of overcoming problems of digital noise and circuit arrangement, and a clamp circuit, or an imaging apparatus having the clamp circuit.

A DC level control method according to the present invention is a DC level control method that is so designed as to hold a DC level of a clamp interval in an electric signal at a prescribed value, wherein, independently of an A/D converting section of a signal processing system converting the electric signal to a digital signal and carrying out digital signal processing, by using an A/D converting section for comparing a DC level which has a lower bit resolution relative to the A/D converting section of the signal processing system, a comparison between the DC level during a sampling period in an electric signal and a pre-determined reference value is made by the A/D converting section for comparing DC levels to obtain a difference between the DC level and the reference value, and a clamp signal is fed back to the electric signal so that the difference of the DC value and the reference value thus obtained may reach approximately zero.

A clamp circuit according to the present invention comprises an A/D converting section for DC level comparison, wherein the circuit compares a DC level during a period of sampling in the electric signal with a predetermined reference value by means of the A/D converting section for DC level comparison, acquires a difference between the DC level and the reference value, and feeds back a clamp signal to the electric signal so as to reduce the difference obtained between the DC level and the reference value.

An imaging apparatus according to the present invention comprises a solid state imaging device, an A/D converting section for DC level comparison, and a feedback section which, by comparing a DC level during a period of sampling of an imaging signal with a predetermined reference value by means of the A/D converting section for DC level comparison, obtains a difference between the DC level and the reference value, and feeds back a clamp signal to the imaging signal so as to reduce the difference obtained between the DC level and the reference value.

BRIEF DESCRIPTION OF THE DRAWINGS

The invention disclosed herein will be understood better with reference to the following drawings of which:

FIG. 4 is a diagram of a more detailed configuration of an imaging apparatus;

FIGS. 9A, 9B show diagrams explaining an imaging apparatus having a clamp circuit including a processing section of a digital circuit and associated wave forms according to a second preferred embodiment of the present invention;

FIGS. 10A, 10B show diagrams explaining a fine clamp circuit, and associated wave forms according to a second preferred embodiment of the present invention;

DETAILED DESCRIPTION OF THE PREFERRED EMBODIMENTS

Embodiments according to the present invention will now be described in detail below with reference to the accompanying drawings.

Figure 1A:
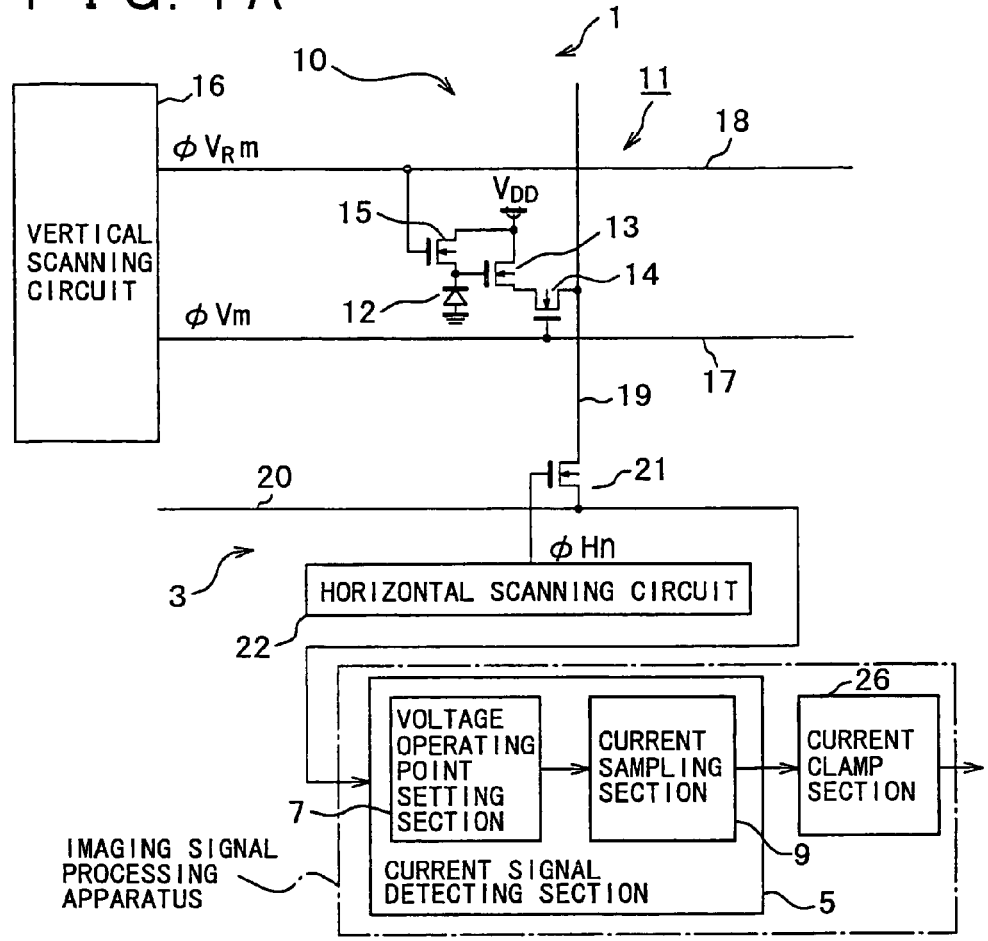
FIGS. 1A, 1B show diagrams of a configuration of an imaging apparatus having a solid state imaging device of a current output system and an imaging signal processing apparatus according to a first preferred embodiment of the present invention.
Figure 1B:
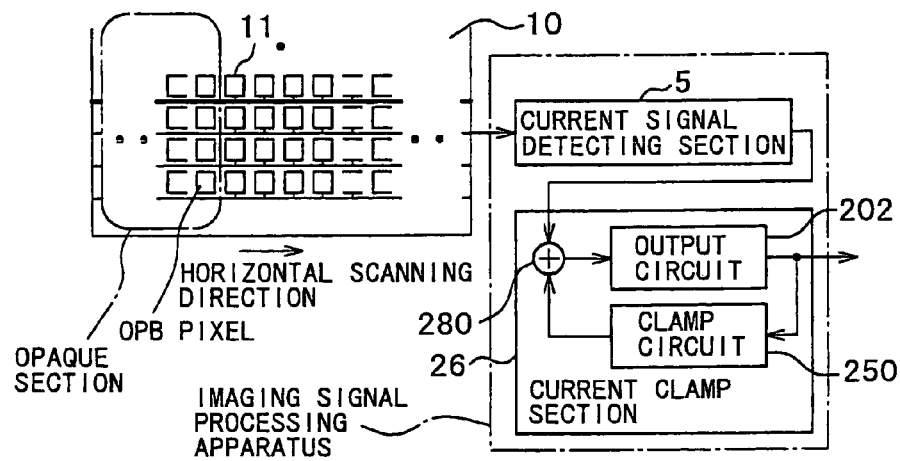

FIGS. 1A and 1B show diagrams of a configuration of an imaging apparatus having a solid state imaging device of a current output system and an imaging signal processing apparatus according to a first preferred embodiment of the present invention. An imaging apparatus 1 has, for example, a CMOS imaging device as a solid state imaging device 3. Further, the imaging apparatus 1 comprises a current signal detecting section 5 having a voltage operating point setting section 7 and a current sampling section 9, and further a current clamp section 26 in the latter part of the solid state imaging device 3. It should be pointed out that the solid stage imaging device 3, the current signal detecting section 5, and the current clamp section 26 may be formed on a single semiconductor substrate.

In FIG. 1A, a unit pixel 11 of a photosensitive section (sensor array) 10 comprising the solid state imaging device 3 is constituted by a photodiode 12, an amplifier transistor 13, a vertical selection transistor 14, and a reset transistor 15. As these transistors 13 to 15, in the present example, n-channel MOS transistors are employed. The unit pixel 11 being arrayed in an X direction (row) and a Y direction (column) comprises a pixel section. In this example, to simplify the drawing, only a pixel of column m and row n is shown.

In the unit pixel 11, a vertical scanning pulse φVm is provided to a gate electrode of the vertical selection transistor 14 from a vertical scanning circuit 16 through a vertical selection line 17, and a vertical reset pulse φVRm is provided to a gate electrode of a reset transistor 15 from the vertical scanning circuit 16 through a vertical reset line 18. Further, a signal charge subjected to photoelectric conversion at the photodiode 12 is converted to a signal current at the amplifier transistor and outputted to a vertical signal line 19 through the vertical selection transistor 14.

A horizontal line selecting transistor 21 is connected to between a vertical signal line 19 and a horizontal signal line 20. A horizontal scanning pulse φHn is provided to a gate electrode of the horizontal line selecting transistor 21 from a horizontal scanning circuit 22, thereby enabling a signal current outputted from the pixel 11 to the vertical signal line 19 to flow through the horizontal line selecting transistor 21 to the horizontal signal line 20.

To one end of the horizontal signal line 20, there is connected a current signal detecting section 5, and via a voltage operating point setting section 7 and a current sampling section 9 included therein, a current clamp section 26 is further connected. For the current signal detecting section 5, it is desirable to use, for example, a section constituted by a CDS processing function of current mode as disclosed in Japanese Patent Application Publication No. 2002-102108 assigned to the present applicant.

The voltage operating point setting section 7 stably maintains the voltage of the horizontal signal line 20 at approximately a constant level (for example, in proximity to the GND level) at all times. The current sampling section 9 receives, as a current, a pixel signal through the horizontal signal line 20 which is an example of the pixel signal line, and by making a sampling of the current, an offset current included in the current signal is eliminated, thereby extracting only a pure signal. This enables a FPN (Fixed Pattern Noise) included in the pixel signal to be suppressed.

The current clamp section 26, by clamping a predetermined position (specifically, an optical black level, OPB) of the signal current inputted via the current signal detecting section 5 from the horizontal signal line 20, maintains, at a constant value, the OPB level which is a reference level of the current signal. At the latter part of the current clamp section 26, there is provided, as necessary, a current-voltage conversion circuit which converts a signal current inputted from the current clamp section 26 to a signal voltage and outputs it.

The solid state imaging device 3 comprises, in addition to a photosensitive section 10 including photodiodes 11 arrayed in the vertical and horizontal directions (refer to FIG. 1B), an output control circuit and an output circuit (both not illustrated) for respective vertical and horizontal scanning circuits. As necessary, it may be so configured that a micro-lens is arranged on respective photodiodes 11 to focus a picture image to be taken.

As shown in FIG. 1B, on a part of an end of the photosensitive section 10, there are arranged sensor columns (opaque section) by masking an upper part of the photodiodes 11. An output of this section being a segment free from light at all times becomes a black level (optical black level), and such pixel is called an OPB pixel. These OPB pixels are typically provided on the starting side of vertical scan for a few lines (line=1 horizontal scan period) and on the starting side of horizontal scan for a few pixels.

The current clamp section 26 detects a DC level of a predetermined period in an imaging signal outputted in current mode from the current signal detecting section 5 and feeds back the clamp current to the imaging signal in such a manner that a difference between the detected DC level and the predetermined reference value reaches approximately zero. Specifically, the current clamp section 26 has an output circuit 202, a clamp circuit 250, and an adding section 280. The current clamp section 26 detects an output signal of the OPB pixel and makes a comparison between the detected value and the predetermined reference value. In the present embodiment, a current signal outputted from the current signal detecting section 5 is converted to a voltage signal at the output circuit 202, whereas a comparison between the OPB level of the voltage signal and the reference voltage is made at the clamp circuit 250.

Then, the clamp circuit 250 varies the clamp level (i.e., OPB level), so that when an OPB pixel output becomes larger than the reference voltage, the clamp level is made smaller according to the result of comparison, and performs a negative feedback control to make the output level of the OPB pixel converge to the reference value. In the present configuration, a feedback signal from the current clamp section 26 after CDS processing by the current signal detecting section 5 is added in terms of current (clamp current), thereby making it possible to vary the DC level of a signal thereafter to a desired value (predetermined reference value).

Figure 2:
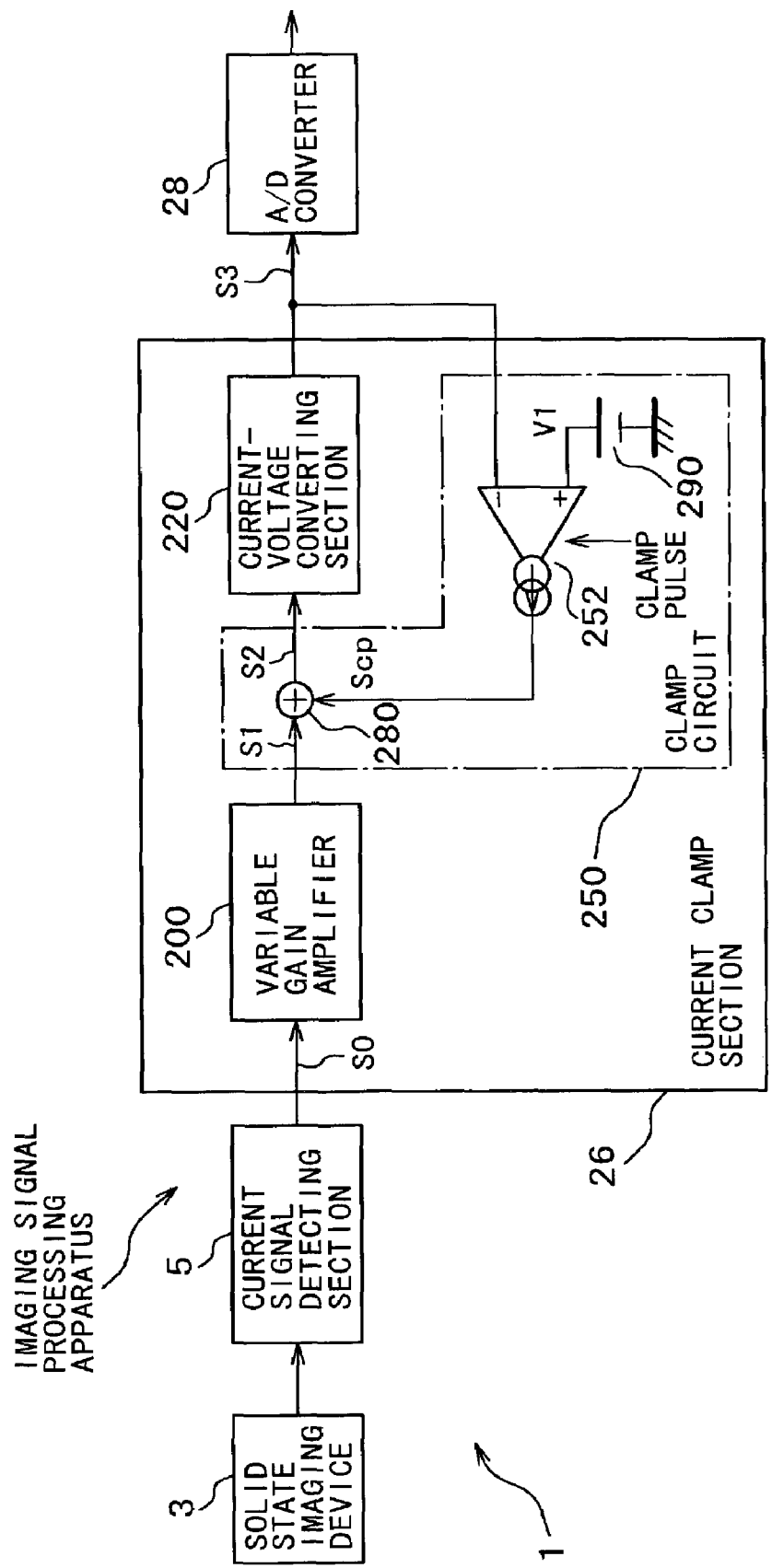
FIG. 2 is a block diagram showing a current clamp section together with an entire view of an imaging apparatus.

FIG. 2 is a block diagram showing a functional configuration of the current clamp section 26 in the imaging apparatus 1 of the above-mentioned configuration, together with the whole of the imaging apparatus 1. As illustrated, the current clamp section 26 is constituted by a variable gain amplifier (VGA) 200 that controls a current gain, a current-voltage converting section (hereinafter referred to as a current-voltage converting section 220) which is an example of the output circuit 202 converting a current signal to a voltage signal, and the clamp circuit 250.

The clamp circuit 250 has a differential amplifier 252 of a current output type which performs monitoring of a voltage signal S3 outputted from the current-voltage converting section 220 and outputs a result thereof as a clamp current Scp. Namely, the differential amplifier 252 of the current output type is provided with both functions as follows: a DC level comparing section, which detects a DC level of a predetermined period in an imaging signal and obtains a difference between the DC level and the reference value by comparing the detected DC level with the predetermined reference value; and a current feedback section which feeds back the clamp current to the imaging signal so that the difference between the DC level and the reference value reaches approximately zero.

For example, to the predetermined position (location dependent on a circuit configuration) of the differential amplifier 252 of the current output type, there is inputted a clamp pulse defining a clamp timing. Specifically, the OPB clamp is realized by inputting a pulse corresponding to the OPB pixel position of the solid state imaging device 3.

Further, the current clamp section 26 comprises essentially of the current adding section 280 which adds a current signal S1 amplified to a predetermined level by the variable gain amplifier 200 to the clamp current Scp obtained from the differential amplifier 252 to output a synthetic current S2, and a reference voltage source 290 which is an example of an operating reference point setting section that sets an operating reference point of the differential amplifier 252. To the latter stage of the current clamp section 26, there is connected an A/D converter 28 for signal processing system which converts an analog signal to a digital signal.

In this configuration, the current signal detecting section 5 detects an imaging signal outputted from the solid state imaging device 3 of the current type as a current signal S0 by applying a CDS subtraction processing as the current signal, and supplies the current signal S0 to the variable gain amplifier 200. The variable gain amplifier 200 amplifies the current signal S0 being subjected to the CDS processing in the current signal detecting section 5 to the predetermined level and supplies it to one terminal of the current adding section 280. The current-voltage converting section 220 converts a current signal S2 supplied from the current adding section 280 to a voltage signal S3. The voltage signal S3 is then converted to a digital signal by the multi-bit (for example, 8-11 bits) A/D converter 28 for signal processing system.

The differential amplifier 252 constituting the clamp circuit 250 monitors the voltage value of an optical black level of the voltage signal S3 outputted from the current-voltage converting section 220, and carries out the feedback in current mode to the input of the current-voltage converting section 220 by supplying the result thereof as the clamp current Scp to the current adding section 280. Namely, the solid state imaging device 3, the current signal detecting section 5, the variable gain amplifier 200, the current-voltage converting section 220, and the like output an offset component other than pure signal components, thus causing a DC level fluctuation in the output signal. In order to absorb this DC level fluctuation by the clamp current Scp, the clamp circuit 250 is provided.

The clamp function of the present configuration is realized by comparing the output level of the OPB pixel of the voltage signal 3 outputted from the current-voltage converting section 220 with the reference voltage V1 of any arbitrary reference voltage source 290 by the differential amplifier 252, and by applying feedback in the form of a current subsequent to the variable gain amplifier 200 so as to reduce a difference there between to zero. Since the CDS subtraction processing has already been completed in the current signal detecting section 5, it is possible to clamp at this position.

Further, to apply feedback in a current mode, a special circuit such as a voltage adder employing resistance or the like is not necessary. Hence, it is an advantage of the present invention that the clamp current Scp is simply added to the signal current S1 obtained from the variable gain amplifier 200 to control the DC level of the signal component of the OPB pixel. Accordingly the system is configured to be simple and the number of parts is reduced.

Still further, since the current signal detecting section 5 having the CDS function and the variable gain amplifier 200 perform the signal processing in a current signal mode, when processing signals with a limited power voltage, there is an additional advantage such that it is easy to secure a dynamic range of a circuit as compared when processing in a voltage signal mode. Prior to converting to a voltage signal with the current-voltage converting section 220, it is possible to accomplish an object to secure the dynamic range of the analog circuit by applying the feedback once in the current clamp section 26.

Furthermore, in this example, the variable gain amplifier 200 is inserted subsequent to the current signal detecting section 5. The variable gain amplifier 200 may be inserted prior to the current signal detecting section 5 having the CDS function, and if it is not particularly necessary, the variable gain amplifier 200 may be omitted. Moreover, not only the variable gain amplifier 200 but also other circuit blocks such as a sample hold circuit of a current type may be inserted.

It should be noted that, although the feedback is applied in this example to the clamp current at the latter stage of the variable gain amplifier 200, it may be applied immediately after the current signal detecting section 5. In this case, when a gain of the variable gain amplifier 200 is altered, a gain is applied to an offset component outputted by the solid state imaging device 3 and the current signal detecting section 5 and to a clamp current to eliminate the offset component as well. Consequently, there is an advantage that it is difficult for the clamp operation to be released when the gain of the variable gain amplifier 200 is altered. However, a noise component of the clamp current is subjected to be gain controlled altogether, so that it becomes disadvantageous in terms of S/N when the gain is increased.

Figure 3A:
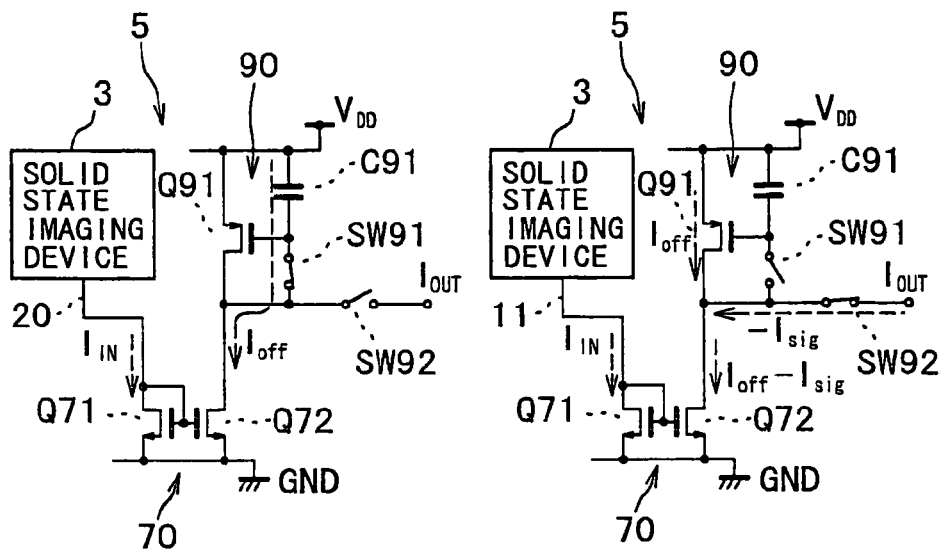
FIGS. 3A, 3B show diagrams of a configuration of a current signal detecting section and associated wave forms according to a first preferred embodiment of the present invention.
Figure 3B:
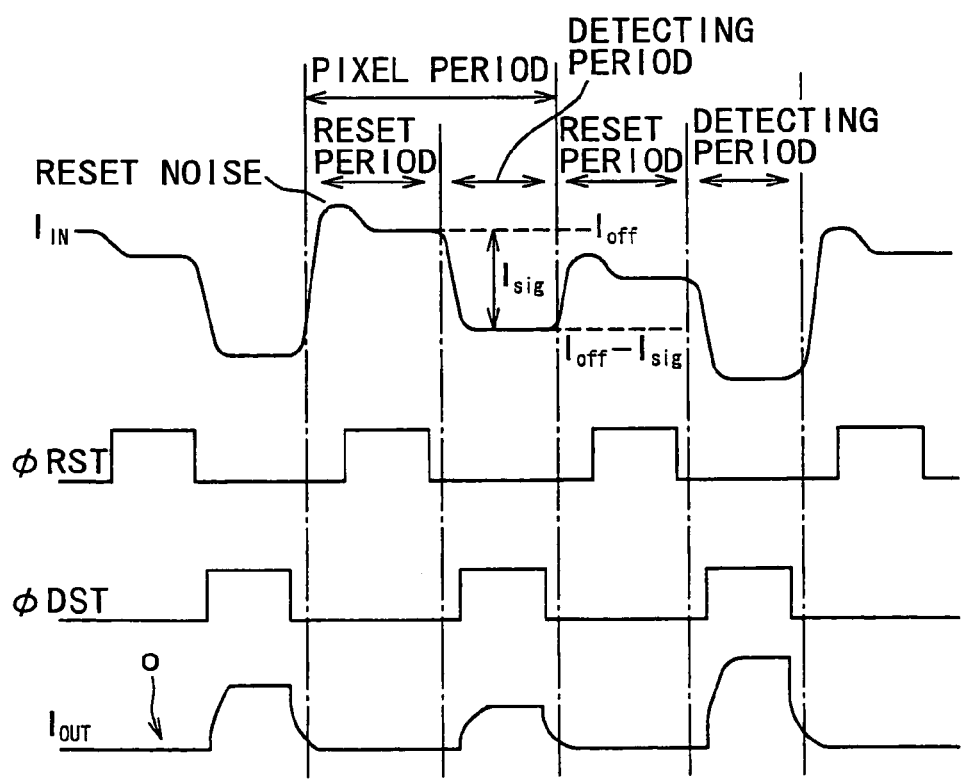

FIG. 3A shows diagrams illustrating a configuration of a first preferred embodiment of the current signal detecting section 5. FIG. 3A is its circuit diagram, and FIG. 3B is a timing chart to explain its operation. A configuration as illustrated employing a current mirror 70 is characterized by the use of a current copier (current memory cell) 90 as a current sampling section 9. It is to be noted that this configuration is the same configuration of an embodiment of a current signal detecting section as disclosed in Japanese Patent Application Publication No. 2002-102108 assigned to the present applicant.

A current mirror 70 exemplifies a current/current converting section that receives a current signal outputted via the horizontal signal line 20 which is an example of a pixel signal line of the solid state imaging device 3, and outputs a current signal having an amplitude corresponding to the amplitude of the received current signal.

As shown in FIG. 3A, the current mirror 70 is constituted by an n-channel MOS transistor Q71 as a device on the input side and an n-channel MOS transistor Q72 as a device on the output side. In the MOS transistor Q71, its drain and gate are commonly connected to the horizontal signal line 20 and its source is connected to ground as a reference potential, while its gate is connected to a gate of the transistor Q72, and a source of this transistor Q72 is connected to ground (GND). Namely, the pixel signal line 20 through which signals flow from the solid state imaging device 3 is connected to the current mirror 70 comprising essentially the n-channel MOS transistors Q71 and Q72. Transistors having the same characteristics are employed for both n-channel MOS transistors Q71 and Q72.

Further, as shown in FIG. 3A, a current copier 90 is constituted by a p-channel MOS transistor Q91 with its drain as an input/output terminal connected to the drain of the n-channel MOS transistor Q72 and its source connected to a power line VDD, a sampling capacitance device C91 connected to between a gate of the p-channel MOS transistor Q91 and the power line VDD, a switch device SW91 connected to between the gate and a drain of the p-channel MOS transistor Q91, and a switch device SW92 connected to between the drain and a current output terminal $I_{OUT}$ of the p-channel transistor Q91.

Namely, at first, the output of the current mirror 70, that is, the drain terminal of the n-channel MOS transistor Q72 is connected to the drain terminal of the p-channel MOS transistor Q91, the sampling capacitance device C91 is connected to between the gate of the p-channel MOS transistor Q91 and the power voltage VDD, and further, the switch device SW91 is inserted between the gate and the drain of the transistor Q91, thus constituting the current copier 90.

The switch device SW92 is connected to the tip of a node connecting the drains of the n-channel MOS transistor Q72 and the p-channel MOS transistor Q91, and is further connected to the output terminal $I_{OUT}$.

At this point, as shown on the left side in FIG. 3A, when it is so controlled as to put the switch device SW91 in a conduction mode and the switch device SW 92 in an non-conduction mode, the current copier 90 is disposed in an input phase, while, as shown on the right side in FIG. 3A, when it is so controlled as to put the switch device SW91 in a non-conduction mode and the switch device SW 92 in a conduction mode, the current copier 90 is disposed in an output phase.

It should be pointed out that, in the example of FIG. 3A, since the solid state imaging device 3 has the n-channel MOS transistor as the amplifier transistor 13, the n-channel MOS transistor as the current mirror 70 and the p-channel MOS transistor as the current copier 90 are respectively used accordingly, whereas, if the solid state imaging device 3 has the p-channel MOS transistor as the amplifier transistor 13, the current mirror 70 and the current copier 90 may take a form where transistors having the reverse polarity of n-channel and p-channel of the transistors employed in FIG. 3A are used.

In FIG. 3B, there are shown a control pulse φRST for the switch device SW91, a control pulse φDST for the switch device SW92, and an output signal waveform $I_{OUT}$ appearing at the output terminal $I_{OUT}$ are shown corresponding to an output signal waveform $I_{IN}$ from the solid state imaging device 3. However, the control pulses φRST and φDST control the switch devices SW91 and SW92 to be in a conduction mode (ON) when they are in a high (H) period, and to be in an non-conducting mode (OFF) when they are in a low (L) period. By means of the switch control of the φRST and φDST, the p-channel MOS transistor Q91 and the capacitance device C91 operate as the current copier.

From the solid state imaging device 3, a signal current $I_{IN}$ of a signal waveform shown in FIG. 3B is supplied to the n-channel MOS transistor Q71 of the current mirror 70 via the horizontal signal line 20. This signal waveform is the same as the general output signal waveform of the solid state imaging device of the current output type. For example, there are a reset period and a detecting period in one pixel period, and there are outputted a signal Ioff of the offset component during the reset period and a detecting current "Ioff-Isig" during the detecting period. The signal Isig which is a difference thereof becomes a signal current which is primarily necessary.

The signal current $I_{IN}$ outputted from the solid state imaging device 3 is supplied via the pixel signal line 20 to the current mirror 70 which is constituted by the n-channel MOS transistors Q71 and Q72. Since the current mirror 70 operates so that the input current and the output current become equal, the signal current inputted into the n-channel MOS transistor Q71 appears as is in the drain of the n-channel MOS transistor Q72.

When the output signal $I_{IN}$ of the solid state imaging device 3 is in the reset period, as shown on the left in FIG. 3A, in the H period of the control pulse φRST, the switch device SW91 is controlled to be in the conduction mode, and in the L period of the control pulse φDET, the switch device SW92 is controlled to be a non-conduction mode. At this instant, the current copier 90 enters the input phase so that all of the current Ioff flowing from the solid state imaging device 3 via the current mirror 70 are inputted.

And then, a voltage corresponding to the value of the signal current (offset component) Ioff appears on the gate terminal of the p-channel MOS transistor Q91, and by turning the switch device SW91 non-conductive at the next instant, the gate voltage at that moment is stored by the capacitive device C91. This current copier 90 becomes an output phase, memorizes the previously inputted offset current Ioff, and starts to keep flowing as is.

In this condition, the output signal $I_{IN}$ from the solid state imaging device 3 shifts next to the detecting period, and the signal "Ioff–Isig" flows in via the current mirror 70. But, since the current copier 90 is in the output phase, it tries to continue flowing the current Ioff which is previously put in memory in the capacitive device C91. At that instant, by turning the switch device SW92 to be conductive, only a difference of the current Ioff put into memory of the current copier 90 and the signal current "Ioff–Isig" flowing in via the current mirror 70 appears on the $I_{OUT}$ terminal. That is, the signal $I_{OUT}$=Ioff–(Ioff–Isig)=Isig is obtained. This means that a pure signal Isig not containing the offset component Ioff appears on the $I_{OUT}$ terminal.

In this manner, by using the configuration shown in FIG. 3A, the offset current Ioff causing the FPN is eliminated, thereby enabling only the primary signal component Isig to be extracted from the output terminal $I_{OUT}$ as the current signal $I_{OUT}$ and realizing the CDS processing function (i.e., FPN suppressing function) of current mode. It is to be noted that the output current signal, though not in continuous waves, can be converted to continuous waves by the sampling.

This circuit comprises one current mirror 70 including essentially the n-channel MOS transistors Q71 and Q72, the p-channel MOS transistor Q91, the capacitive device C91, and one current copier 90 constituted by the switch devices SW91 and SW92. It has a characteristic of very simple circuit configuration with a small number of devices. Further, since the control to the current copier 90 functioning as the current sampling section 9 has only two phases such as memorizing during the reset period and outputting during the detecting period, it is characterized by extremely simple control.

Further, a potential of the pixel signal line 20 is determined at all times by the n-channel MOS transistor Q71 to which a diode constituting the current mirror 70 is connected and becomes a bias value corresponding to the sum of adding a Vth of the n-channel MOS transistor Q71 plus a current value at that instant and the size of the transistor. Proper selection of the Vth of the transistor and its size makes it possible to keep the potential stable at all times in the vicinity of GND. Furthermore, this enables the amplifier transistor 13 in the solid state imaging device 3 to maintain a good amplification factor at all times, preventing linearity from getting worse.

FIG. 4 is a diagram showing a more detailed configuration of the imaging apparatus 1. Together with an embodiment of the current signal detecting section 5 utilizing the current copier 90 shown in FIG. 3A mentioned above, it illustrates an embodiment of the variable gain amplifier 200 and the current-voltage converting section 220.

The variable gain amplifier 200 provided at the latter stage of the current signal detecting section 5 is constituted by a current mirror circuit which comprises the n-channel MOS transistors Q201, Q202, Q203, and Q204, current sources 1201, 1202, 1203, and 1204 corresponding respectively to the n-channel MOS transistors Q201 to Q204, and the switch devices SW202a, SW202b, SW203a, SW203b, SW204a, and SW204b disposed respectively among the current sources 1202 to 1204 corresponding to the n-channel MOS transistors Q202 to Q204.

In the illustration, the n-channel MOS transistor Q201 and the current source 1201 are disposed on the current input side, while the n-channel MOS transistors Q202 to Q204 and the current sources 1202 to 1204 are switchably arranged on the current output side. Namely, it is so configured that output stages of the current mirror circuit are placed in three parallels on the output side. It should be noted that this configuration is arranged corresponding to a necessary gain, and that it is not especially limited to the three parallels. Further, although the current mirror circuit is constituted by n-channel MOS transistors, p-channel MOS transistors may be employed for configuration.

A current signal SO outputted from the current signal detecting section 5 is inputted into the gate terminal of the n-channel MOS transistor Q202 on the input side of the variable gain amplifier 200 of the current mirror configuration. The current mirror circuit simply outputs the inputted current according to its mirror ratio. But by making the mirror ratio variable, it is possible to perform a variable gain operation. This is where the switch devices SW202a to SW204b come into play, because they are provided to make the mirror ratio variable. When continuity is applied to these switch devices SW202a to SW204b according to a necessary gain, the mirror ratio can be determined. Further, there are provided current sources 1201 to 1204 as an arrangement of running a bias current, so that even if the signal current S1 from the current signal detecting section 5 becomes zero, the variable gain amplifier 200 can operate.

The current-voltage converting section 220 provided at the latter stage of the variable gain amplifier 200 is constituted by the differential amplifier 222, a resistance device 224 disposed between an inverted input terminal (−) and an output terminal of the differential amplifier 222, and a reference voltage source 226 disposed between an non-inverted input terminal (+) of the differential amplifier 222 and the reference voltage (specifically, GND (ground)). The reference voltage source 226 serves as a reference voltage when performing current-voltage converting operation in the current voltage converting section 220.

The current signal S1 outputted from the variable gain amplifier 200 is directly inputted into the inverted input terminal (−) of the differential amplifier 222 constituting the current-voltage converting section 220. Further, the clamp current Scp from the differential amplifier 252 having a clamp function in a current mode is directly inputted into the inverted input terminal (−) of the differential amplifier 222.

Namely, according to this configuration, the current signal S1 from the variable gain amplifier 200 and the clamp current Scp from the differential amplifier 252 are synthesized by the inverted input terminal (−) of the differential amplifier 222 and directly converted to a voltage signal S3 by the differential amplifier 222. Since addition of the current is directly performed by the inverted input terminal (−) of the differential amplifier 222, a special circuit such as a voltage adder using a resistance and the like is not required, thus enabling the number of parts to be reduced. In this manner, a clamp circuit of the current type matching with a combination with the solid state imaging device 3 of the current output type may be produced.

The clamp circuit 250 has a switch device 254 which controls a clamp timing between the inverted input terminal (−) of the differential amplifier 252 of the current output type and the output of the current-voltage converting section 220. A clamp pulse defining the clamp timing is inputted into a control terminal of the switch device 254. Specifically, the OPB clamp is realized when a pulse corresponding to an OPB pixel position of the solid state imaging device 3 is inputted.

In this configuration, the differential amplifier 252 monitors the voltage signal S3 outputted from the inputted voltage of the A/D converter 28, that is, the current-voltage converting section 220 at any arbitrary time (OPB timing in the previous example) controlled by the switch device 254, and applies the feedback in a current mode to the input of the current-voltage converting section 220 (the inverted input terminal (−) of the differential amplifier 222 in this example). It should be noted that the sample hold circuit and the like may be inserted before the differential amplifier 252 so that while the switch device 254 is off, the values monitored while it is on can be held.

It should be pointed out that the use of the current clamp section 26 of a current feedback type makes it possible to neglect a voltage adder required for a voltage feedback type as well as a capacitance device for eliminating a DC component. By simply adding the clamp current Scp to the signal current S1, a clamp operation can be carried out. As a result, it is possible to decrease the number of parts as well as the number of circuits through which the signal passes, hence, the mixing of noise from outside can be reduced.

Further, a circuit itself for injecting the clamp current can be simply formed, for example, by using the constant current characteristic of an MOS transistor, thereby abating the complexity of the system. Especially, by constituting a CDS circuit of the current type such as the current signal detecting section 5 illustrated in FIG. 4, the clamp circuit of the current feedback type can be employed, thus contributing to simplifying the system. For instance, by using a CMOS transistor and the like, the solid state imaging device 3, the current signal detecting section 5, and the current clamp section 26 can be integrally formed on a semiconductor substrate.

Furthermore, since the current signal detecting section 5 having the CDS function and the variable gain amplifier 200 perform the signal processing of the current type, there is an advantage in securing a dynamic range of a circuit more easily than processing of the voltage type, when processing signals within a limited range of power voltage.

Figure 5A:
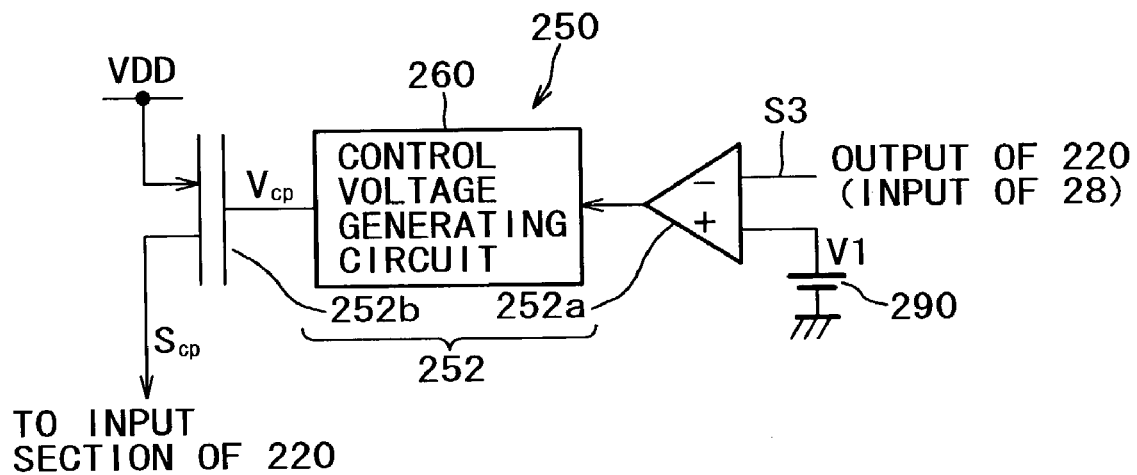
FIGS. 5A, 5B show diagrams of a detailed configuration of a clamp circuit.
Figure 5B:
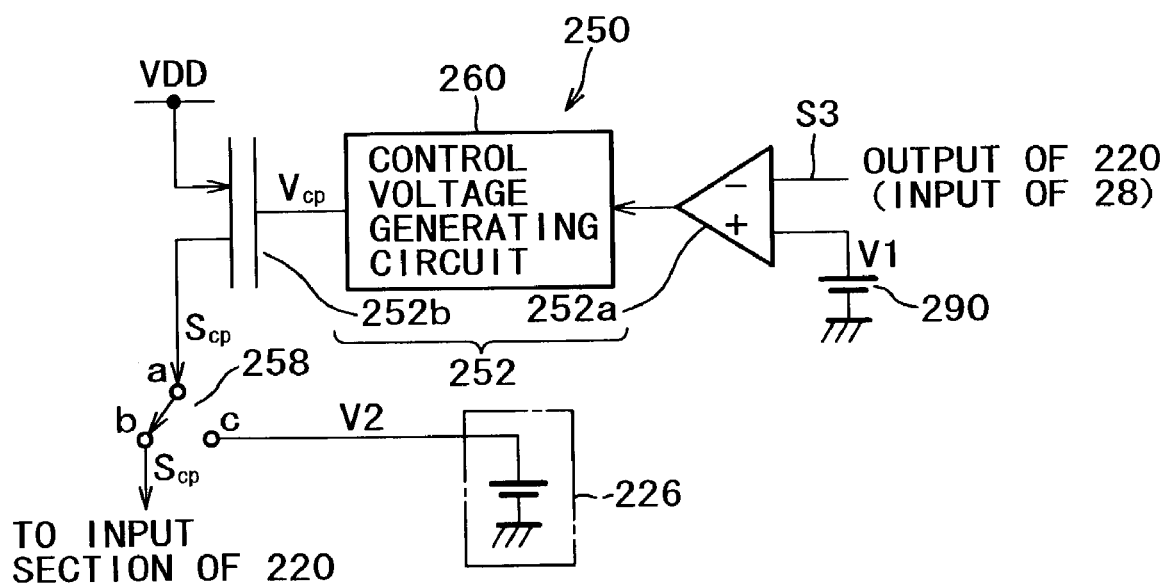

FIGS. 5A, 5B show configuration examples of the clamp circuit 250 in detail. An example shown in FIG. 5A is a case where the differential amplifier 252 of the current output type is specifically constituted by a CMOS transistor. The differential amplifier 252 of the current output type comprises essentially a differential amplifier 252a and a p-channel MOS transistor 252b as main parts. The clamp circuit 250 has, between the differential amplifier 252a and the p-channel MOS transistor 252b, a control voltage generating circuit 260 generating the clamp voltage Vcp which controls a gate terminal of the p-channel MOS transistor 252b upon receiving an output from the differential amplifier 252.

A source terminal of the p-channel MOS transistor 252b is connected to a power source (VDD in this example), and a drain terminal thereof is connected to an input of the current-voltage converting section 220. In considering by corresponding to the current-voltage converting section 220 as shown in FIG. 4, it is so configured that the drain terminal is connected to the inverted input terminal (−) of the differential amplifier 222, while the clamp current Scp generated in the p-channel MOS transistor 252b is inputted into the inverted input terminal (−) of the differential amplifier 222.

By adding a voltage that makes the p-channel MOS transistor 252b operate in the saturation region to the control voltage generating circuit 260, the p-channel MOS transistor 252 operates as a current source of flowing a current corresponding to a voltage between the gate and the source. Namely, the p-channel MOS transistor 252b functions as a voltage-current converting section to convert the clamp voltage Vcp outputted from the control voltage generating circuit 260 to the clamp current Scp. By this means, it is possible for the clamp circuit 250 to function as the clamp circuit of the current output type.

It should be noted that even if it is so configured that an output voltage of the difference amplifier 252a is added directly to the gate terminal of the p-channel MOS transistor 252b without using the control voltage generating circuit 260, it is possible to control the DC level of an output signal, that is, to operate the clamp function.

Further, in an example shown in FIG. 5A, it is so configured that the p-channel MOS transistor 252b alone supplies the clamp current Scp to the input of the current-voltage converting section 220. However, there may be another configuration in which the p-channel MOS transistor 252b is replaced with a n-channel MOS transistor so as to pull in the clamp current Scp from the input of the current-voltage converting section 220 to the n-channel MOS transistor side. Still another configuration may be utilized, in which operation is performed by using both the p-channel MOS transistor and the n-channel MOS transistor by switching the direction of a current flow.

Further, according to the example shown in FIG. 5A, the clamp voltage Vcp outputted from the control voltage generating circuit 260 is converted to the clamp current Scp by using the p-channel MOS transistor 252b. But the conversion is not limited to this case, since by constructing the output terminal of the differential amplifier 252a in terms of the current output type, it may also be so configured that the output of the differential amplifier of the current output type can directly generate the clamp current Scp without providing a voltage-current converting section including the control voltage generating circuit 260, the MOS transistor and the like.

The second example of FIG. 5B illustrates a configuration wherein a triple-terminal switch device 258 is inserted into the drain terminal of the p-channel MOS transistor 252b. An input terminal a of the triple-terminal switch device 258 is connected to the drain terminal of the p-channel MOS transistor 252b, while an output terminal b on one side is connected to an input section of the current-voltage converting section 220, thus forming a configuration whereby an output terminal c on the other side is connected to the operating reference point of the current-voltage converting section 220.

Corresponding to the current-voltage converting section 220 shown in FIG. 4, there is provided a configuration in which the output terminal b is connected to the inverted input terminal (−) of the differential amplifier 222 and the clamp current Scp generated in the p-channel MOS transistor 252b is inputted into the inverted input terminal (−) of the differential amplifier 222 via the triple-terminal switch device 258. Further, the output terminal c is connected to the non-inverted input terminal (+) of the current-voltage converting section 220, so that the same reference voltage V2 as the reference voltage source 226 connected to the non-inverted input terminal (+) may be impressed. The role of the triple-terminal switch device 258 will be described below.

As the specific example of the current signal detecting section 5 is cited in FIG. 3A, when for performing the CDS processing in a current mode by using a current copier cell, it is necessary to close the switch device SW92 for the sake of the sampling during the reset period. At this instant, because the signal current S1 will not flow into the variable gain amplifier 200 and the clamp circuit 250, only the clamp current Scp flows into the current-voltage converting section 220.

During a time period of the signal current flowing, the clamp current Scp flows so as to assure properly the dynamic range of the current-voltage converting section 220, hence, if the signal current S1 becomes zero, it is possible for the current-voltage converting section 220 to be off from the dynamic range temporarily due to the clamp current Scp. Generally, in the case of an I/V converting circuit made by using a differential amplifier, once it is off form the dynamic range, it may take time before the normal operating condition is restored as in the case of its operating speed becoming extremely slow.

To avoid problems mentioned above, the switch device 258 is subjected to on/off control at the same timing as the on/off control of the switch device SW92. Namely, when the switch device SW92 is in the state of non-conductive mode so that the signal current S1 will not flow into the current-voltage converting section 220 side, the switch device 258 is cut off from the output terminal b to separate the input section of the current-voltage converting section 220 from the p-channel MOS transistor 252b. By this means, the feedback of the clamp current Scp to the imaging signal S1 to be inputted into the current-voltage converting section 220 is stopped, whereby the clamp current Scp is prevented from flowing into the current-voltage converting section 220 and the dynamic range is prevented from being off.

Further, if the switch device 258 is simply cut-off, the clamp current Scp from the p-channel MOS transistor 252b loses a pass to flow through, thereby, the current value of the clamp current Scp is to reach zero. Then, the next time, the switch device 258 is connected to the output terminal b side to start flowing the clamp current Scp, it takes time before it settles to the desired current value: hence, it may not be able to reproduce the signal accurately within the predetermined time period.

Consequently, instead of simply carrying out the on/off control of the switch device 258, there are employed procedures as shown in FIG. 5B, whereby, by switching the switch device 258 from the output terminal b to the output terminal c side when putting the switch device SW91 non-conductive and connecting to the non-inverted input terminal (+) side of the current-voltage converting section 220, connection is changed to the reference voltage source 226 to which the non-inverted input terminal (+) is connected. Namely, during the reset time period to put the switch device SW92 non-conductive, the feedback of the clamp current Scp to the imaging signal is stopped, while, at the same time, the clamp current Scp which stopped the feedback is fed back to the reference voltage source 226 which is for setting an operating reference point of the current-voltage converting section 220.

By doing so, in terms of the p-channel MOS transistor 252b that flows the clamp current Scp, even when the clamp current Scp is flowed into the current-voltage converting section 220 and when is not flowed, it appears that nothing has changed. As a result, a current controlled by the control voltage generating circuit 260 at all times can be run, thus making it possible to maintain the stability of the clamp current Scp. Namely, the stability of the clamp current Scp is maintained at all times, and the next time the clamp current Scp is run into the imaging signal S1, a desired current can be instantly obtained.

As mentioned above, according to the configuration of the above-mentioned embodiment, since the clamp circuit of the current feedback type is arranged to be used, the voltage adder, the capacitance device for eliminating the DC component and the like required in the case of the voltage feedback type are made unnecessary, thus enabling the DC clamp by simply feeding back the clamp current to the signal current. Consequently, the number of parts can be decreased and the number of circuits for the signal to pass is decreased as well. Hence, the mixing of noise from outside and the like can also be reduced.

Further, as shown in the detailed configuration of FIGS. 5A, 5B, the circuit itself to which the clamp current flows can be simply formed by utilizing the constant current characteristic of the MOS transistor, thereby restraining the complexity of the system. Furthermore, in combination with a CDS circuit and a VGA circuit configured to perform signal processing of the current type, when processing a signal within a limited power voltage, it is possible to acquire an advantage due to an effect of more easily securing the dynamic range of a circuit than by processing with the voltage type.

Figure 6A:
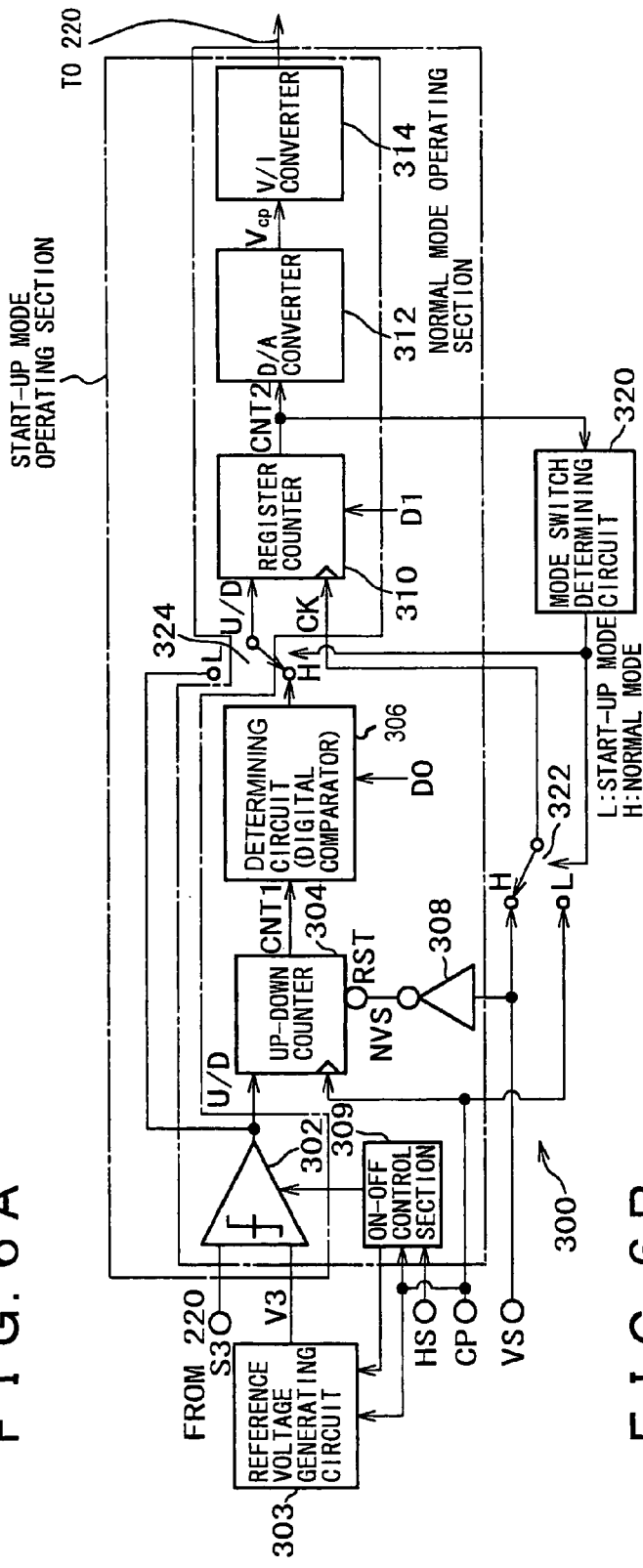
FIGS. 6A, 6B are a block diagram showing a more detailed configuration of a clamp circuit, and associated wave forms.
Figure 6B:
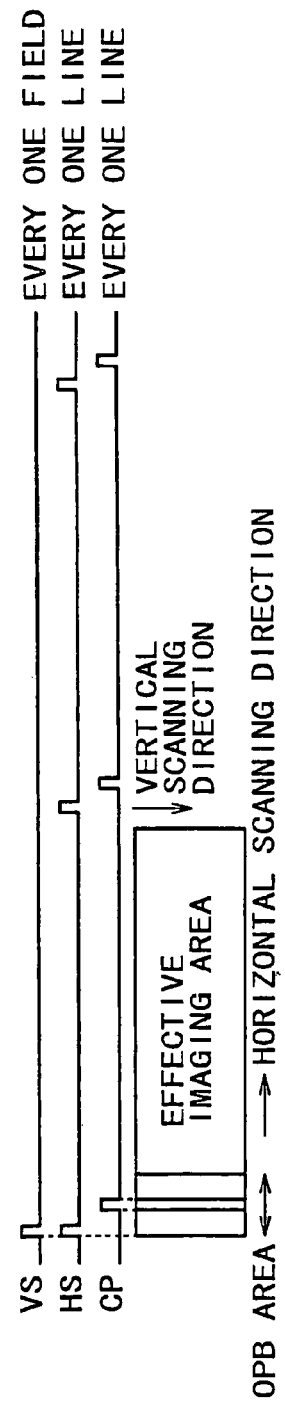

FIGS. 6A and 6B are a diagram showing a configuration of a clamp circuit, particularly a control voltage generating circuit in more detail and associated wave forms. FIG. 6A is a block diagram showing its configuration, while FIG. 6B is a timing chart of pulse signals used in the clamp circuit. The clamp circuit 300 comprises a processing section of a digital circuit including an exclusive-use A/D converting section provided independently from an A/D converter 28 for signal processing system. It is characterized in that by returning a processing result (digital value) of the digital circuit to an analog voltage signal through a D/A converter and supplying it as an input voltage of the p-channel MOS transistor 252b, the clamp current Scp is generated in the p-channel MOS transistor 252b. Further, the clamp circuit 300 comprises being operable by either a start-up mode operating section having a response rate of comparatively high speed or a normal mode operating section having a response rate of comparatively low speed.

As shown in FIG. 6A, the clamp circuit 300 is constituted by a comparator 302 corresponding to the differential amplifier 252a in the clamp circuit 25 as previously mentioned above, an up-down counter 304 for counting the number of the comparing pulse CP, and a determining circuit 306 which determines whether or not a count value CNTR of the up-down counter 304 meets predetermined conditions. An inverted vertical synchronizing signal NVS obtained by inverting a vertical synchronizing signal VS at an inverter 308 is inputted into a reset terminal RST of the up-down counter 304, and it is so designed that a count value CNT1 is reset for each inverted vertical synchronizing signal NVS.

Further, the clamp circuit 300 includes a register counter 310 having an up-down counting function, a D/A converter 312 converting a count value CNT2 of the register counter 310 directly to an analog voltage Vcp, and a voltage-current converter (V/I converter) 314 which converts an outputted analog voltage from the D/A converter 312 to a current signal. The current signal (the clamp current Scp) outputted from the voltage-current converter 314 is fed to the input section of the current-voltage converting section 220.

A control system from the register counter 310 to the current-voltage converting section 220 has such a polarity that when the count value CNT2 increases, the OPB level increases, while the count value CNT2 decreases, the OPB level decreases. For the voltage-current converter 314, the p-channel MOS transistor 252b in the clamp circuit 250 mentioned above may be employed. In this case, an output of the D/A converter 312 is connected to the gate terminal of the p-channel MOS transistor 252b, and an inverting amplifier may be provided as necessary so as to produce the control polarity as mentioned above.

The register counter 310 is arranged so that an object to be counted differs corresponding to the operation mode of the clamp circuit 300. Because of this arrangement, the clamp circuit 300 comprises essentially a mode switch determining circuit 320, a first switch 322 which switches a pulse inputted into a clock terminal CK of the register counter 310 under control of the mode switch determining circuit 320 to either the vertical synchronizing signal VS or the comparing pulse CP, and a second switch 324 which likewise switches a signal inputted into the up/down switch terminal (U/D) of the register counter 310 to either the output of the comparator 302 or the determining circuit 306.

The up-down counter 304 and the register counter 310, though having different objects to be counted, are the same in that their basic operation includes an up-down count function. However, since the count value CNT2 of the register counter 310 directly bears a register value of the D/A converter 312 of the latter stage, an initial value D1 corresponding to an OPB level desired to be converged to is set in the register counter.

And, independently of the A/D converter 28 for a signal processing system that converts an imaging signal S3 from the current-voltage converting section 220 into a digital signal and performs digital signal processing, as an A/D converting section for comparing DC levels having a lower bit resolution relative to the A/D converting section for signal processing system, there are provided the comparator 302 and the up-down counter 304 or the register counter 310.

For example, at the time of the start-up mode, by means of the comparator 302 and the register counter 310, there is constituted essentially a 1-bit A/D converting section in which an actual sampling frequency becomes a frequency of the comparing pulse CP. Further, at the time of a normal mode, by means of the comparator 302 and the up-down counter 304, there is constituted essentially a 1-bit A/D converting section. Furthermore, based on the digital data acquired by the comparator 302 functioning as an A/D converting section for DC level comparison, the up-down counter 304 or the register counter 310, the determining circuit 306 and the register counter 310 function as a digital processing section that obtains a control voltage signal corresponding to a difference between the DC level and the reference value.

The vertical synchronizing signal VS for operation control and the comparing pulse CP used in the clamp circuit 300 are issued from a timing generator not illustrated herein. As shown in FIG. 6B, the vertical synchronizing signal VS is the first pulse to be transmitted every one field (or every one frame). Further, the comparing pulse CP is a pulse transmitted in an OPB pixel position at the leading side of the horizontal scanning direction, interlocking with the horizontal synchronizing signal HS to be transmitted first for each horizontal scanning line (1H) of the photosensitive section 10. The comparing pulse CP is for comparing an output signal of any arbitrary column of OPB pixels prepared at the leading side of the horizontal scanning direction of the solid state imaging device 3 to the reference voltage at a timing of the comparing pulse CP. It is to be noted that at the OPB pixel position at the leading side of the vertical scanning direction, the comparing pulse CP is so arranged as not to be issued.

The reference voltage V3 from the reference voltage generating circuit 303 is inputted into an input terminal on one side of the comparator 302. The reference voltage generating circuit 303 generates not a fixed reference voltage but the reference voltage V3 which swings (switching to high voltage side and to low voltage side, alternately) at approximately a constant width for each comparing pulse CP. The reference voltage V3 is the voltage to which the OPB level is desired to be converged, and its median value V30 and its swing width ΔV3 are determined in line with signal processing at the latter stage of the current clamp section 26.

The comparator 302 compares the value of the reference voltage V3 to the value of the voltage signal S3 outputted from the current-voltage converting section 220, and outputs a result thereof in a digital value. Specifically, if the reference voltage V3 is greater than the voltage signal S3, "H (high)" is outputted, while "L (low)" is outputted for any other case. The result of this comparison is inputted into the up-down switch terminal (U/D) of the register counter 310 in the start-up mode, and it is inputted into the up-down switch terminal (U/D) of the up-down counter 304 in the normal mode.

The up-down counter 304 and the determining circuit 306 are units which operate only in the normal mode. The up-down counter 304 adds "+1" to the count value CNT1K when the comparing pulse CP is inputted into the clock terminal CK as the up-down switch terminal (U/D) is "H," that is, when the reference voltage V3→the voltage signal S3. Conversely, when the up-down switch terminal (U/D) is "L," that is, when the reference voltage V3≦the voltage signal S3, the comparing pulse CP is inputted into the clock terminal CK, then, "−1" is added to the count value CNT1.

As FIG. 6B indicates, the comparing pulse CP is to be sent out at the OPB pixel position. As a consequence, by means of the comparator 302 and the up-down counter 304, the output signal S3 of the predetermined column of the OPB pixels in the horizontal scanning direction and the reference voltage V3 are compared with each other at the timing of the comparing pulse CP, whereas the result of the comparison is to be reflected in the count value CNT1 of the up-down counter 304.

The count value CNT1 of the up-down counter 304 is inputted into the input terminal on one side of the determining circuit 306. The determining circuit 306 is configured specifically as a digital comparator, and a signal DO (digital value) is inputted, as a determining reference value, to the input terminal on the other side.

The determining circuit 306 outputs a signal to add "−1" to the count value CNTR2 of the register counter 310 in the next vertical synchronizing signal VS when the count value CNT1 is greater than the positive determining reference value "DO." Conversely, when it is smaller than the negative determining reference value "−DO," a signal to add "+1" to the count value CNT2 of the register counter 310 is outputted. The output of the determining circuit 306 is inputted into the up-down switch terminal (U/D) of the register counter 310.

When in the start-up mode, it is the register counter 310 to use the comparing output of the comparator 302, whereas when in the normal mode, it is the up-down counter 304 to use the comparing output. The above is the only difference, and the counting operation based on the comparing output is, both in the start-up mode and the normal mode, performed in terms of the comparing pulse CP following the horizontal synchronizing signal HS. Namely, essentially, the comparing operation between the reference voltage V3 and the OPB level is performed only by the comparing pulse CP after the horizontal synchronizing signal HS.

Accordingly, during a time period other than when the comparing pulse CP is active, the comparator 302 and the reference voltage generating circuit 303 are not required to operate. Rather, if they are in operation, a DC current would be streaming into the comparator 302 and the reference voltage generating circuit 303, thus wasting current consumption. Therefore, all that is needed is for the comparing pulse CP to be ENABLE only during the active timing. Hence, in the present embodiment, it is so configured that a control signal rising with the horizontal synchronizing signal HS and falling with the comparing pulse CP is produced by the on/off control section 309, so that by applying ENABLE to the comparator 302 and the reference voltage generating circuit 303 through this control signal, a switch is made to a standby status other than during the sampling period. Illustration of the specific circuitry of the on/off control section 309 is omitted. The standby status means that a status in which a power current flowing in the circuit is smaller than in the ENABLE status during the sampling period. This enables current consumption to be reduced.

The clamp circuit 300 of the above-mentioned configuration is connected to operate in such a way that in both the stat-up mode and the normal mode, when the OPB pixel output level of the voltage signal S3 outputted by the current-voltage converting section 220 is greater than the reference voltage V3, the comparator 302 output becomes "L," thus decreasing the count value CNT2 of the register counter 310 by "1" and further decreasing the clamp control voltage Vcp, which is the analog output of the D/A converter 312, by "1LSB." As a result, the entire system forms a negative feedback control system in which the OPB pixel output level (OPB level) of the current-voltage converting section 220 also becomes smaller to decrease a difference with the reference voltage V3.

As apparent from FIG. 6B, the comparing pulse CP is in high frequency as compared with the vertical synchronizing signal VS. Therefore, when the comparing pulse CP is inputted into the clock input terminal CK of the register counter 310 for setting the register value of the voltage-current converter 314, the entire control system operates at comparatively high speed. The clamp circuit 300 sets this operating state as the start-up mode. On the other hand, when the vertical synchronizing signal VS is inputted into the clock input terminal CK, the entire control system operates at comparatively low speed. The clamp circuit 300 sets this state as the normal mode.

Incidentally, when the difference between the OPB pixel output and the reference voltage V3 becomes smaller than the output change due to fluctuation of "1LSB" of the voltage-current converter 314, it falls into a status in which the output voltage of the voltage-current converter 314 becomes higher and/or lower. Although this status may be described as the stable point in terms of the above-mentioned digital control, when the voltage fluctuation appears as an uneven image, it cannot be described as the stable point; rather, it would be more appropriate by describing it in the state of oscillation. On one hand, this status shows that the OPB pixel output and the reference voltage V3 are sufficiently close to each other.

Now, in an actual control, when the OPB pixel output is far from the reference voltage, an operating status to get closer to the reference voltage V3 is set as the start-up mode (mode output L), and comparatively high-speed operation may be achieved by subjecting the register counter 310 to a counting operation based on the comparing pulse CP. When the mode switch determining circuit 320 detects that the OPB pixel output and the reference voltage V3 are in the sufficiently close state when operation is made in the start-up mode, a shift is made to the normal mode (mode output H) for low-speed operation. So that the above-mentioned oscillation state will not occur in the normal mode, the operation is made at a lower speed and lower sensitivity than in the start-up mode.

The mode switch determining circuit 320 determines, by monitoring a change of the output voltage of the D/A converter 312 from a rising status to a falling status, whether or not the OPB pixel output becomes close to the reference voltage V3. For example, a comparison is made between the converging target clamp level and the actual OPB level in terms of the comparator 302 which is an analog comparator. When a fluctuation width of the OPB level for one step by the D/A converter 312 is greater than the target clamp level and the OPB level, moving the output voltage of the D/A converter 312 up and down may cause a state of oscillation. Further, even if the state of oscillation is not reached, discrete control is digitally performed, hence, even if the fluctuation is within a converging range, the up and down movement of the OPB level with the target clamp level in the center will repeat.

Now, the mode switch determining circuit 320 determines that, not only when the target clamp level and the actual OPB level are determined to be sufficiently close, but also when the up and down movement (including the movement due to the state of oscillation) of the OPB level is detected, the condition of shift to the normal mode is met. As a method of determining the mode switching, by monitoring changes in the count value CNT2 of the register counter 31, it is possible to determine based on a one-time change from the rising status to the falling status (or reverse) of the output voltage of the D/A converter 312 that the mode switch condition is met. Further, it is also possible to determine that the mode switch condition has been met provided that several times of up and down are counted.

Figure 7:
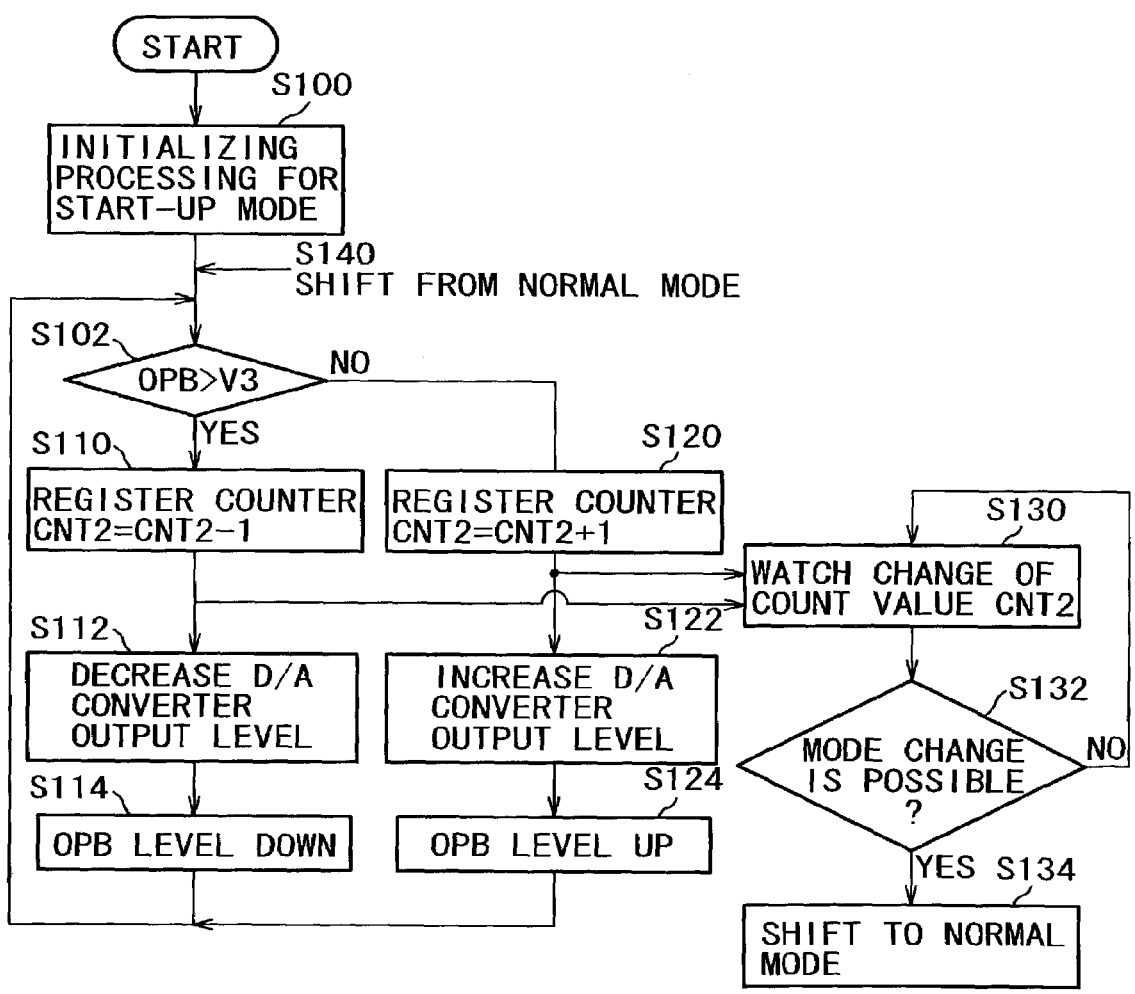
FIG. 7 is a flowchart showing control operation in start-up mode in a clamp circuit.

FIG. 7 is a flowchart showing control operation in the clamp circuit 300 in the start-up mode. The start-up mode compares the target level desired to be converged to during the comparing pulse CP period as the clamp pulse with the actual OPB level through the comparator 302 which is an analog comparator; in the case where the detected OPB level is low, the count value CNT2 of the register counter 310 is increased by 1, while in the case of a high level, processing is performed to decrease it by 1. Since the register counter 310 is connected to the D/A converter 312, as the count value CNT2 is converted to an analog value, and as the value is added to the signal line by the current adding section 289, the OPB level moves up and down. In this manner, a high-speed pull-in operation is possible by making the OPB level closer to the target level desired to be converged to at every comparison. Detailed description will be made as follows.

The clamp circuit 300 first performs "initialization of the start-up mode" (S100) For example, the mode switch determining circuit 320 sets the mode output at "L." Further, the clamp circuit 300 sets the initial value D1 in the register counter 310. Upon receiving this setting, the voltage corresponding to the initial value D1 is outputted from the voltage-current converter 314, whereas the voltage-current converter 314 upon receipt thereof supplies the initial clamp current Scp to the input section of the current-voltage converting section 220.

Next, the clamp circuit 300 compares the OPB shown by the voltage signal S3 of the current-voltage converting section 220 with the reference voltage V3, and the result of this comparison is inputted into the register counter 310 bearing the register value of the D/A converter 312. The result of the pull-in operation is reflected as the result of comparison between the OPB pixel and the reference voltage V3 by the comparing pulse CP which is rising at a timing of outputting the OPB pixel.

Specifically, at first, by means of the comparator 302 and the register counter 310, the OPB level shown by the voltage signal S3 of the current-voltage converting section 220 is compared with the reference voltage V3 based on the comparing pulse CP (S102). If the OPB level is greater than the reference voltage V3, the register counter 310 adds "−1" to the register count value CNT2. Accordingly, the D/A converter 312 lowers its output voltage (S112), reducing the OPB level (S114). Thereafter, returning back to step S102, the above-mentioned processing (S102 to S114) for the next horizontal scanning is repeated. Namely, until the OPB level becomes below the reference voltage V3, the OPB level is decreased to the reference voltage V3 by repeating the above-mentioned processing for each OPB pixel of horizontal scanning.

Conversely, when the OPB level is below the reference voltage V3 (less or equal to), the register counter 310 adds "+1" to the register count value CNT2 (S102 to S120). Upon receipt thereof, the D/A converter 312 increases its output voltage (S122), resulting in a small increase of the OPB level (S124). Thereafter, a return is made to step S102, and the above-mentioned processing (S102 to S124) is repeated with regard to the next horizontal scanning. Namely, until the OPB level becomes above the reference voltage V3, the OPB level is increased to the reference voltage V3 by repeating the above-mentioned processing for each OPB pixel of horizontal scanning.

In this process, the mode switch determining circuit 320 monitors the count value CNT2 of the register counter 310, counts the number of times of changes of the count value CNT2 from up to down or down to up (S130), and determines whether or not the count obtained meets the predetermined switching condition to the normal mode (S132). If the switching condition is met, the mode switch determining circuit 320 shifts the clamp circuit 300 to the normal mode by switching the mode output from "L" to "H" (S134).

Since switching of the OPB level control voltage through steps S122 and S132 is carried out for each comparing pulse, it is a comparatively high-speed control operation. Namely, in the start-up mode, the operation can be performed as a mode in which the OPB clamp level is rapidly converged to the set value.

It should be noted that after shifting to the normal mode, if the clamp operation is made unstable due to some cause to put the OPB level outside of the predetermined range, the mode switch determining circuit 320 can shift the clamp circuit 300 to the start-up mode (S140) by switching the mode output from "H" to "L," the above-mentioned high-speed pull-in operation can be restarted.

Figure 8A:
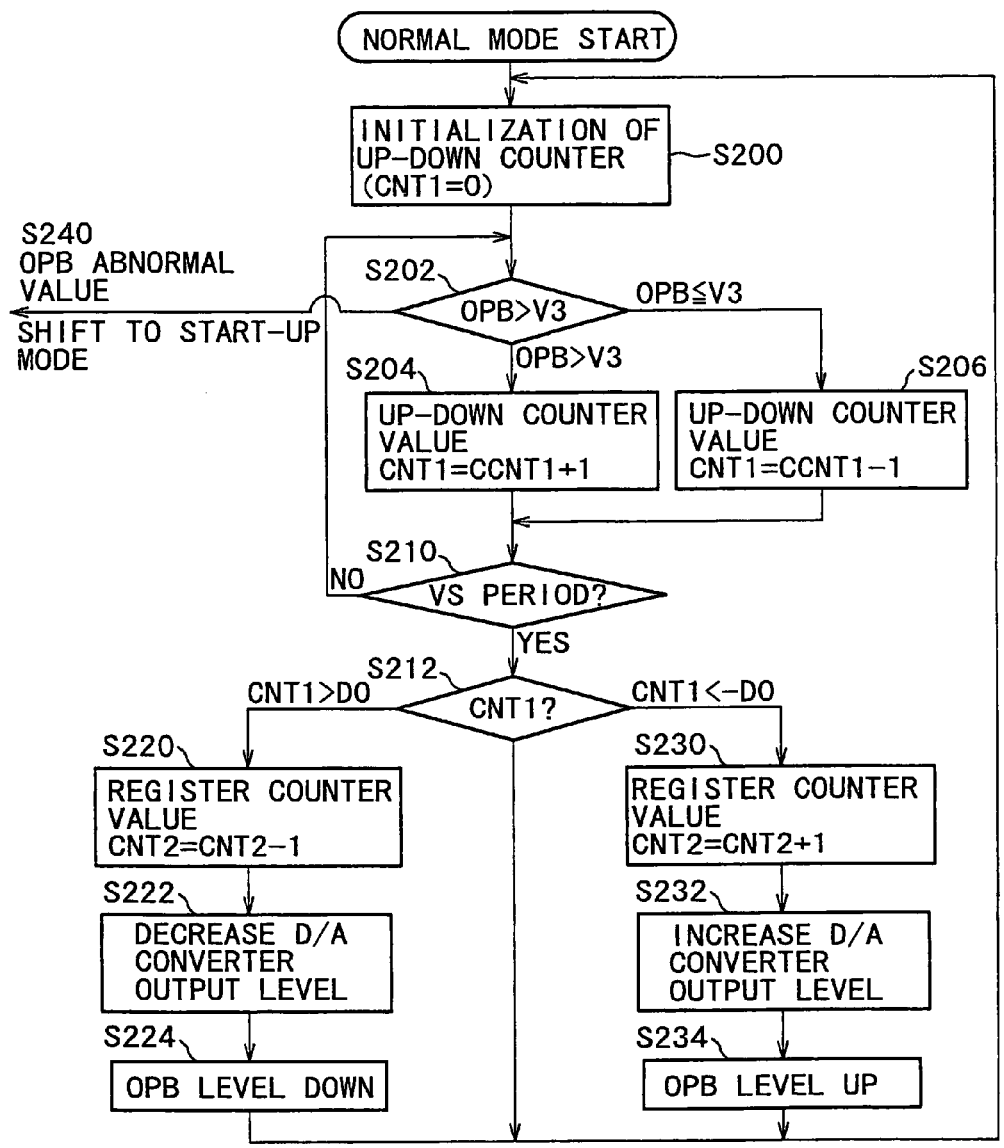
FIGS. 8A, 8B show diagrams for explaining control operation in normal mode in a clamp circuit and associated wave forms.
Figure 8B:
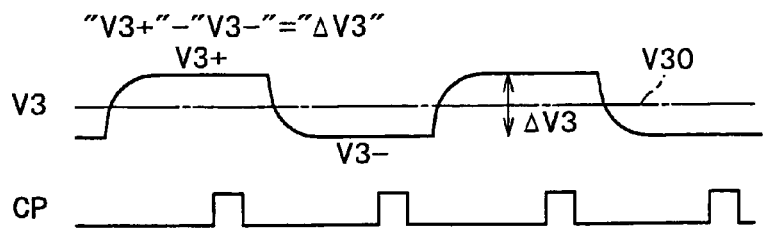

FIGS. 8A, 8B show diagrams explaining the normal mode control operation of the clamp circuit 300 and associated waveforms. FIG. 8A is a flowchart showing control procedures, while FIG. 8B is a diagram showing an example of the reference voltage V3 generated by the reference voltage generating circuit 303.

When the mode is shifted from the start-up mode to the normal mode, the clamp circuit 300 first initializes the count value CNT1 of the up-down counter 304 (S200). Further, in this normal mode, the comparing output of the comparator 302 is switched to the register counter 310 side, which is cleared each time by the vertical synchronizing VS, and inputted.

And if the OPB pixel output level is greater than the reference voltage V3 in one frame, "+1", or if less, "−1" is repeated. Should the count value CNT1 be greater than the positive reference value "DO," the determining circuit 306 sends a signal in the next vertical synchronizing signal VS to add "−1" to the count value CNT2 of the register counter 310. Conversely, should it be smaller than the negative reference value "−DO," a signal to add "+1" to the count value CNT2 is sent.

Specifically, at first, by means of the comparator 302 and the up-down counter 304, a comparison between the OPB level shown by the voltage signal S3 of the current-voltage converting section 220 and the reference voltage V3 is carried out based on the comparing pulse CP (S202). If the OPB level is greater than the reference voltage V3, the up-down counter 304 adds "+1" to the count value CNT1 (204). Conversely, if the OPB level is smaller than (less or equal to) the reference voltage V3, the up-down counter 304 adds "−1" to the count value CNT1 (S206). The determining circuit 306 compares the count value CNT1 with the determining reference D0 and inputs the result of the comparison to the register counter 310. The vertical synchronizing signal VS is inputted into the clock terminal CK of the register counter 310, and the register counter 310 verifies the determining result of the determining circuit 306 for each vertical synchronizing signal VS (S210).

As shown in FIG. 8B, the reference voltage generating circuit 303 fluctuates the reference voltage V3 in the normal mode up and down for a fluctuation width ΔV3 for each comparing pulse CP. Correspondingly, for example, a value "64" is set as the determining reference value D0 in the determining circuit 306 so that the register counter 310 is caused to operate once the count value CNT1 of the up-down counter 304 crosses over a value "±64." If the OBP pixel output is greater than the level "V3+" having a high reference voltage V3, the up-down counter 304 repeats adding "+1" for each comparing pulse CP, reaching "+63" at the 64$^{th}$ comparison (S202, S204, and S210).

Now, if the determining result of the determining circuit 306 indicates that the count value CNT1 is greater than the positive reference value "D0" (64 in the previous example), the register counter 310 adds "−1" to the count value CNT2 simultaneously with the next vertical synchronizing signal VS (S220). Upon receipt thereof, the D/A converter 312 reduces the output voltage thereof (S222). Accordingly, the OPB level decreases (S224). Thereafter, a return is made to step S200 to repeat the above-mentioned processing (S200 to S224) regarding the next frame. Namely, the above-mentioned processing is repeated until the OPB pixel output becomes close to the median value V30 of the reference voltage V3.

Conversely, if the OPB pixel output is greater than a small level "V3−" of the reference voltage V3, the up-down counter 304 repeatedly adds "−1" for each comparing pulse CP, and at the 64$^{th}$ comparison, reaches "−64" (S202, S206, and S210) Now, if the determining result of the determining circuit 306 indicates that the count value CNT1 is smaller than the negative reference value "−D0" (−64 in the previous example), the register counter 310 adds "+1" to the count value CNT2 simultaneously with the next vertical synchronizing signal VS (S230). Upon receipt thereof, the D/A converter 312 increases the output voltage thereof (S232). Accordingly, the OPB level increases (S234). Thereafter, a return is made to step S200 to repeat the above-mentioned processing (S200 to S234) regarding the next frame. Namely, the above-mentioned processing is repeated until the OPB pixel output becomes close to the median value V30 of the reference voltage V3.

In this manner, in the normal mode, during the clamp pulse period, a comparison is made between the reference voltage V3 corresponding to the target clamp level desired to be converged to and the actual OPB level in terms of the comparator 302, and the result thereof (high/low) is counted by the up-down counter 304. The up-down counter 304 is driven to add "+1" in case it is high with respect to the converging level desired to be converged to, and "−1" in case it is low, thereby maintaining the count value CNT1, and with the up-down counter 304, the count value CNT1 is monitored. Only upon crossing of the count value CNT1 over the predetermined level (determining reference value of the previous example ±D0), the signal for changing the clamp level is sent out to the register counter 310.

By making the comparison result thus not directly reflected on as output of the D/A converter 312, stability can be provided with respect to errors and noises of the comparator. Moreover, by changing the clamp level immediately after the vertical synchronizing signal VS, which is a start pulse of vertical scanning after a need to change the clamp level occurs, it is possible to stabilize one frame of image and prevent noise generation in the image.

On one hand, when the OPB pixel output is in between a high level "V3+" of the reference voltage V3 and a low level "V3−" for each comparison based on the comparing pulse CP, the up-down counter 304 repeats the addition of "+1" and "−1" with respect to the count value CNT1. As a result, the up-down counter 34 cannot reach "±64" and the clamp level remains to be fixed. In this way, the fluctuation width ΔV3 of the reference voltage V3 operates as an insensitive zone of the clamp circuit 300.

The clamp level corresponds to a value, i.e., the count value CNT2 revised to an analog value by the D/A converter 312, and acquires a discrete value. By taking the fluctuation width ΔV3 larger than the fluctuation portion of the clamp level corresponding to 1LSB of the D/A converter 312, it is possible to put the OPB pixel output into the insensitive zone.

Namely, in the normal mode, the OPB clamp operation can be performed at lower sensitivity than in the start-up mode. Further, this makes it possible to secure stability with respect to noise. However, in actuality, noise is mixed with the OPB pixel output, hence, on an average, even though it falls into the insensitive zone, it may instantaneously crosses over the fluctuation width. In case of a large noise, referring to the previous example, there may be 64 times of counting up or counting down in terms of probability. This fluctuation has a high probability of returning in the next frame, and if this is repeated, this causes a frame flicker. In this case, by adjusting the fluctuation width ΔV3 of the reference voltage V3, the sensitivity of the OPB clamp can be set.

Further, in the normal mode, the register counter 310 is changed synchronously with the vertical synchronizing signal VS. Namely, an actual sampling frequency becomes the frequency of the vertical synchronizing signal VS. This means that the leading portion of one image can alter the clamp level, thereby making it possible to produce an effect of being able to prevent the clamp noise from mixing in the middle of the image. Furthermore, since the OPB level control voltage through steps S222 and S232 is switched for each vertical synchronizing signal VS, it will be a comparatively slow control operation. In this respect, this is highly effective in terms of stably operating the OPB clamp control. Namely, in the normal mode, about the time when the OPB level is approximately converged to the reference value, it is possible to operate in a low sensitive state with respect to the clamp level fluctuation.

It should be noted that after shifting to the normal mode, if the clamp operation becomes unstable by some cause, making the OPB level move outside of the predetermined range (S202), the mode switch determining circuit 320 shifts the clamp circuit 300 to the start-up mode by switching the mode output from "H" to "L" (S240). This enables the high-speed pull-in operation in the start-up mode to restart.

As mentioned above, the processing section configured with the digital circuit holds a DC shift amount necessary for fixing the optical black level (OPB) which is outputted by the solid imaging device 3, that is, holding the OPB clamp level in the solid state imaging device 3 in the digital value, thereby dispensing with the need of an external capacity which is required when holding in analog value. Consequently, the OPB clamp function to suppress the black level fluctuation inside of the screen through digital processing can be realized, while reducing the number of parts and the packaging area.

Further, by setting up a circuit (A/D converter) to digitalize the clamp level separately from the signal system, a low resolution A/D converter can be put to use. For example, for digitalizing the OPB level, the comparator 302, that is, an analog comparator digitalizing in 1 bit can be utilized, thus enabling digital noise problems to be abated and the circuit to be made small with lower sampling frequency than the case of using a multi-bit A/D converter. Hence, integration of the clamp circuit 300 on the same semiconductor substrate as the solid state imaging device 3, makes it possible to provide a solid state imaging apparatus having a clamp system capable of integration.

Furthermore, by setting a plurality of operation modes having different operating speeds and sensitivities with respect to the OPB level fluctuation, it is possible to provide two diametrically opposed characteristics of a high-speed pull-in operation and stability to noise. For example, if it is configured to enable switching between the high-speed start-up mode with the normal sensitivity and the low-speed normal mode with an insensitive zone to be utilized, after the clamp level is converged by means of the start-up mode for rapid converging, a shift to the normal mode (normal operating mode) having low sensitivity to the OPB level fluctuation makes it possible to have both the high-speed pull-in operation and the stability to noise.

By this means, it is possible to converge the clamp level rapidly when releasing "standby," or in the case of a substantial clamp level fluctuation accompanying a sharp fluctuation of an offset amount caused by a change in VGA gain. Also, the clamp level fluctuation can be restrained by holding down the sensitivity in the stable condition.

Reference is made to FIGS. 9A, 9B which show diagrams explaining a second preferred embodiment of an imaging apparatus provided with a clamp circuit including a processing section of a digital circuit and associated waveforms. FIG. 9A is its schematic representation, while FIG. 9B is a timing chart of a control pulse.

An imaging apparatus 1 of a second preferred embodiment is characterized in that the current clamp section 26 has clamp circuits of plurality of different systems of bit resolution (A/D converting precision and D/A converting precision). In between the current adding section 280 and a fine clamp circuit 400, there is provided a switch device 282 for on/off operation of a clamp current Scp2 from the fine clamp circuit 400. A coarse clamp circuit 301 is a clamp circuit having a comparatively small voltage step for each bit (bit resolution) in D/A conversion. On one hand, the fine clamp circuit 400 is a clamp circuit having a voltage step for each bit (bit resolution) in D/A conversion which is finer than the coarse clamp circuit 301.

The basic configuration of each circuit may be, for example, the same as the clamp circuit 300 described in the previous embodiment. In this case, the coarse clamp circuit 301 may be the one only having the start-up mode. It is preferable that the fine clamp circuit 400 is based on both configurations of the start-up mode and the normal mode.

There are employed a comparing pulse CP (φ1) shown in FIG. 9B as a comparing pulse for the coarse clamp circuit 301 and a comparing pulse CP (+2) shown in FIG. 9B as a comparing pulse for the fine clamp circuit 400. The comparing pulse CP (φ1) issues dozens to hundreds of pulses (with respect to an effective imaging area of the photosensitive section 10) consecutively during a horizontal scanning period of one line or a few lines of the OPB pixel area (OPB area φ1) provided at the leading side of vertical scanning of the solid state imaging device 3.

On one hand, the comparing pulse CP (φ2) is the same as the comparing pulse CP used in a first preferred embodiment. It is a pulse sent out by the OPB pixel area (OPB area φ2) on the leading side of the horizontal scanning direction. Arrangements should be made to ensure that the comparing pulse CP (φ2) may not be sent out by the OPB pixel area (OPB area φ1) on the leading side of the vertical scanning direction.

For example, if there is a requirement to keep a voltage step for each digital gray-scale below 4 mV (=0.004V) because of a large voltage operating range of 3V to be compensated for by clamping, 3V/0.004V=750 gray-scales are obtained, whereas more than 10 bits are needed conventionally.

It is a feature of the present preferred embodiment that while using less than 10 bits for the A/D conversion and the D/A conversion, the final precision of over 10 bits are secured. Consequently, at first, for a value desired to be converged to by the coarse clamp circuit 301 of a 5-bit/100 mV step, the OPB level is made to be converged to, for example, with an error of maximum ±100 mV. Next, the compensation is made for an error generating in the coarse clamp circuit 301 ±100 mV through the fine clamp circuit 400 of an 8-bit/1 mV step.

The 5-bit/100 mV step by the coarse clamp circuit 301 has a control range of 3.2V. If there is employed a configuration to control 100 mV, which is an error portion of the coarse clamp circuit 301, in terms of a 1 mV step by the fine clamp circuit 400, as the current clamp section 26 as a whole, a bit resolution of more than 3V/3200 gray-scales can be secured, and essentially, the gray-scale control with a precision of over 11 bits becomes possible. Since the fine clamp circuit 400 is of a 1 mV step, it has a control range of 256 mV. Hence, where the coarse clamp circuit 301 can ideally converge at ±50 mV, the present embodiment can control at ±100 mV, thus presenting no problem.

In this manner, when a plurality of clamp circuits having different bit resolutions are used in combination, it is possible to use a clamp circuit of a lower bit resolution than the bit resolution finally required as a bit resolution of each clamp circuit. As a result, a circuit configuration with no need of taking precision into consideration can be employed, and the entire clamp circuit can be made small and simple. In case of the above-mentioned example, without using a circuit requiring a large circuit area such as a 10-bit A/D converter or a D/A converter, a clamp circuit of the digital holding type having required high precision and a wide dynamic range (3V/0.004V=750 steps) can be realized.

To realize a clamp function having a higher precision bit resolution than the respective bit resolutions by using two clamp circuits 301 and 400 having different bit resolutions, the following control method is used: first, as shown in FIG. 9 (B), during the horizontal scanning period of one line or a few lines of the OPB pixel area (OPB area φ1) provided on the lead side of vertical scanning of the solid state imaging device 3, the switch device 282 is turned off to stop temporarily clamp control from the high resolution clamp circuit 400 side; and by driving the coarse clamp circuit 301 through the comparing pulse CP (φ1) having dozens to hundreds of pulses consecutively issued during this horizontal scanning period, clamp control through the coarse clamp circuit 301 is made to converge within the target of ±100 mV (error portion).

The following is a converging method when the coarse clamp circuit 301 is of the same configuration as the clamp circuit 300 described in the first preferred embodiment. First, the start-up mode is set by the mode switch determining circuit 320, and a lower value than the level desired to be converged to is set as the initial value D1 of the register counter 310. By this means, a lower clamp voltage than the target is used from the D/A converter 312, and a corresponding clamp current Scp1 is fed to the current adding section 280.

And the register counter 310 is driven by the comparing pulse (φ1) issued from the leading side of vertical scanning to increment the 5-bit D/A converter 312. At the point of crossing over the level to which the output of the D/D converter 312 is desired to be converged, the driving of the register counter 310 by the comparing pulse (φ1) should be simply stopped. If no convergence to the proximity of the target can be accomplished within one horizontal scanning period, the same driving should be carried out for the OPB pixel element of the next line.

Because there are OPB pixels for a several line portion on the leading side of vertical scanning of the solid state imaging device 3, a pulse rate within one line in the initial value D1 and the comparing pulse (φ1) is set so that the convergence may be achieved within that range. Even in this case, a sampling frequency corresponding to the pulse rate is lower than the sampling frequency for the A/D converter 28 of the signal processing system.

When the OPB level converges to the proximity of the target through the clamp control of the coarse clamp circuit 301, the switch device 282 is turned on to cause the current adding section 280 to operate the clamp control on the fine clamp circuit 400 side. The initializing condition of the circuit on the fine clamp circuit 400 side is set corresponding to the count value CNT2 of the register counter 310 immediately before switching, so that the clamp potential will not fluctuate at the instant when the switch device 282 is turned on.

At this point in time, the OPB level which is the source of control by the coarse clamp circuit 301 is located in close proximity to the target. Then, the register counter 310 is driven by using the comparing pulse (φ2) issued from the leading side of horizontal scanning to adjust the output level of the 8-bi D/A converter 312, therefore, the OPB level is made to converge further to the desired value.

FIGS. 10A, 10B show diagrams explaining a detailed example of the fine clamp circuit 400 and associated waveforms. FIG. 10A is its block diagram, and FIG. 10B is a timing chart of the control pulse. The fine clamp circuit 400 is characterized by having two control systems: one system for controlling the reference voltage covering the clamp level and the other system for controlling the OPB level (clamp voltage).

As FIG. 10A shows, the fine clamp circuit 400 first has a comparator 402 commonly used by the two control systems. The comparator 402 has the same function as the previous comparator 302. And as the system (reference voltage control system) controlling the reference voltage V4 for the comparator 402, the latter stage of the comparator 402 comprises a determining circuit 406 to determine whether or not the output of the comparator 402 meets the predetermined condition, a register counter 410 having up-down counting function as driven by the comparing pulse CP (φ2), and a D/A converter 412 converting a count value CNT4 of the register counter 410 into analog voltage.

A voltage outputted from the D/A converter 412 is supplied to one input terminal of the comparator 402 as a reference voltage V4 of the comparator 402. In the register counter 410 is set the initial value D4 corresponding to the reference voltage V4 of the standard for each vertical synchronizing signal VS.

Further, as the system of controlling the clamp voltage (clamp voltage control system), there are provided a switch 420 to switch a destination of the output of the comparator 402, counters 422 and 424 being connected to respective output terminals of the switch 420, a determining circuit to determine whether or not each of the counts UPC and DWC of the counters 422 and 424 meets the predetermined condition, a register counter 430 having an up-down counting function corresponding to a switching state of a field pulse EOPLS in which L and H alternately switch for each vertical synchronizing signal VS, a D/A converter 432 converting a count value CNT6 of the register counter 430 to analog voltage, and a voltage-current converter (V/I converter) 434 converting an analog voltage outputted from the D/A converter 432 into a current signal.

The switch 420 is designed to be switched according to a polarity of the field pulse EOPLS. The counters 422 and 424 are, respectively, reset by the inverted vertical synchronizing signal NVS, interlocking with the switch of the register counter 410 and performing only the up counting function as driven by the comparing pulse CP (φ2) when the comparing result of the comparator 402 is inputted.

A current signal (clamp current Scp2) outputted from the voltage-current converter 434 is supplied to the current adding section 280 corresponding to an input section of the current-voltage converting section 220. A control system from the register counter 430 to the voltage-current converter 434 is of such polarity that when the count value CNT6 increases, the OPB level increases, whereas when the count value CNT6 decreases, the OPB level decreases.

Every member of the reference voltage control system and the up counter 422 constitute a positive direction displacement acquiring section according to the present invention, while each member of the reference voltage control system and the down counter 424 comprise a negative direction displacement acquiring section according to the present invention. Further, the determining circuit 426 and the register counter 430 make up a determining control section according to the present invention.

Operation of the reference voltage control system entails the following processing. First, an initial value D4 is set in the register counter 410 and an initial value D6 is set in the register counter 430, so that a clamp provided in the coarse clamp circuit 301 will not be affected.

And, while the count value CNT6 of the clamp voltage control system is being held constant, a comparison is made under the comparing pulse CP (φ2) between the OPB output level, which is a signal level at a lamp position (OPB position) of the voltage signal S3, and the reference potential V4 (comparing level), and the result of the comparison provides a basis to reflect on a fluctuation of the reference potential V4 that acquires a discrete value by digital control. Then, again the OPB output level is compared with the reference potential V4 (comparing level). By repeating this processing over a fixed time period, the maximum and the minimum (or its approximation) of the OPB level noise are obtained in terms of the discrete amount. Namely, while the result of comparing the OPB output level with the reference potential V4 (comparing level) is being reflected on the comparing level, a noise status of the OPB level is determined by comparing repeatedly only for the fixed period.

For example, the determining circuit 406 of the reference voltage control system monitors the output of the comparator 402 and inputs a determining result corresponding to the polarity (L/H) of the field pulse EOPLS into the up-down switch terminal (U/D) of the register counter 410. When the comparing result of the comparator 402 indicates that the voltage signal S3 is higher than the reference voltage V4 in an odd field where the field pulse EOPLS is "H," a signal that makes the register counter 410 count up is outputted as the determining result.

This makes the register counter 410 operate only in the "+" direction. The comparing result of the comparator 402 shows "H," that is, when the reference voltage V4<the voltage signal S3, should the comparing pulse CP (φ2) be inputted, the register counter 410 counts up only "+," resulting in an increase of the reference voltage V4 (comparing level) through the D/A converter 412 by one step. At this instant, the changeover switch 420 is switched to the up counter 422 side, and the up counter 422 carries out counting up operation interlocking with the register counter 410.

Accordingly, if the reference voltage V4<the voltage signal S3 in one field where the field pulse EOPLS is "H," an up count UPC of the register counter 410 is stored in the up counter 422. Namely, the up counter 422 functions as a digital memory device counting the number of change steps in the positive direction of the comparing level (reference voltage V4).

On one hand, in the case where the comparing result by the comparator 402 is "L," that is, the reference voltage V4>the voltage signal S3, both the register counter 410 determining the reference voltage V4 (comparing level) through the D/A converter 412 and the up counter 422 storing the up portion do not operate.

As this is repeated a plurality of times under the drive of the comparing pulse CP (φ2) in one field where the field pulse EOPLS is "H," the reference voltage V43 gradually rises to converge to the proximity of the maximum (maximum of the OPB noise) of the OPB level in the voltage signal S3 that can be obtained through the influence of noise.

Next, in an even field where the field pulse EOPLS is "L," first, the initial valued D4 is set in the register counter 410 to initialize the comparing level for the reference level, controlling so that the register counter 410 moves only in one direction opposite to the previous direction. Namely, when the comparing result of the comparator 402 indicates that the voltage signal S3 is lower than the reference voltage V4, a signal to count down the register counter 410 is outputted as the determining result.

This makes the register counter 410 move only in "−" direction, and when the comparing result of the comparator 402 is "L," that is, when the reference voltage V4>the voltage signal S3, upon inputting the comparing pulse CP (φ2), the register counter 410 counts down by "−1," whereas the reference voltage V4 (comparing level) through the D/A converter 412 decreases by one step. At this instant, the changeover switch 420 switches over to the down counter 424 side, and the down counter 424 operates to count up interlocking with the register counter 410.

By this means, if the reference voltage V4>the voltage signal S3 within one field where the field pulse EOPLS is "L," a down count DWC of the register counter 410 is stored in the down counter 424. Namely, the down counter 424 functions as a digital memory device to count the number of steps changing to the negative direction of the comparing level (reference voltage V4) during a period in which the field pulse EOPLS is "L."

On the other hand, in the case where the comparing result by the comparator 402 is "H," that is, the reference voltage V4<the voltage signal S3, both the register counter 410 determining the reference voltage V4 (comparing level) through the D/A converter 412 and the down counter 424 storing the down portion do not operate.

As this is repeated a plurality of times under the drive of the comparing pulse CP (φ2) in one field where the field pulse EOPLS is "L," the reference voltage V4 gradually falls to converge to the proximity of the minimum (minimum of the OPB noise) of the OPB level in the voltage signal S3 that can be obtained through the influence of noise.

In this manner, when operating the reference voltage control system, while using the 1-bit A/D converting circuit employing the comparator 302 (analog comparator), changing the comparing level (reference voltage V4) in the positive direction during a certain period and counting the number of changing steps of the comparing level, the amount of fluctuation (up count UPC) from a certain reference value to the up side is obtained. Likewise, while changing the comparing level (reference voltage V4) to the negative direction during another period and counting the number of changing steps of the comparing level, the amount of fluctuation (down count DWC) from a certain reference value to the down side is obtained.

The determining circuit 426 finds a sum of and a difference between the up count UPC stored in the up counter 422 and the down count DWC stored in the down counter 424, compares them with the preset determining reference, and inputs a signal to increase or decrease the count value CNT6 of the register counter 430 according to the comparing result thereof into the up/down switch terminal (U/D) of the register counter 430.

The sum of the up count UPC stored in the up counter 422 and the down count DWC stored in the down counter 424, when multiplied by the amount of fluctuation of one step of the D/A converter 412, expresses a noise volume (noise width). Further, a difference thereof, when multiplied by the same amount of fluctuation of one step, expresses the error between the first reference level and the OPB output level. Namely, it is possible to estimate the noise volume and the clamp error by referring to the maximum of the OPB output level indicated by the up count UPC and the minimum of the OPB output level indicated by the down count DW.

By referring to the noise width and the error collected during a period of two fields, the determining circuit 426 controls the OPB level (clamp level). For example, the initial value D6 corresponding to the target clamp level is set in the register counter 430 simultaneous at the generation of any arbitrary vertical synchronizing signal VS. When the error obtained by referring to the up count UPC and the down count DWC is greater than the permissible value, by adding "−1" to the count value CNT6 of the register counter 430 holding the clamp level, the clamp level is decreased, while, on the other hand, when the error is smaller than the permissible value, "+1" is added to the count value CNT6 to increase the clamp level. Namely, performing the negative feedback control based on the error which is obtained in reference to the up count UPC and the down count DWC enables the error relating to the target OPB level to converge within the permissible value.

A count timing by the register counter 430 is whenever the field pulse EOPLS switches from "L" to "H" (at the start time of the field immediately after acquiring the error), or every several cycles by taking this as one cycle, and a control pulse CP2 inputted into the clock terminal CK of the register counter 430 regulates this timing. In this way, by changing the clamp level immediately after the vertical synchronizing signal VS which is a start pulse of vertical scanning after a clamp level change becomes necessary, it is possible to stabilize one frame of image and prevent noise from generating in the middle of the image.

Figure 12A:
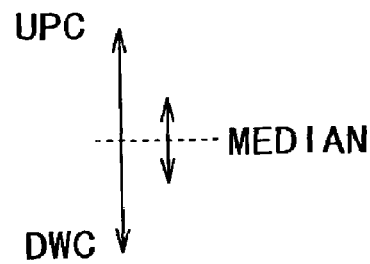
FIGS. 12A to 12C show diagrams for explaining the significance of first adjustment processing and second adjustment processing.
Figure 12B:
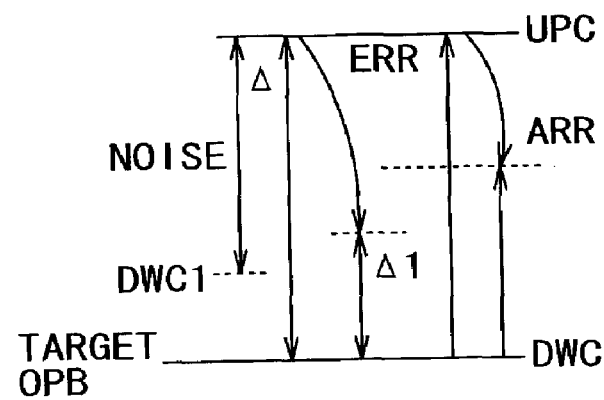
Figure 12C:
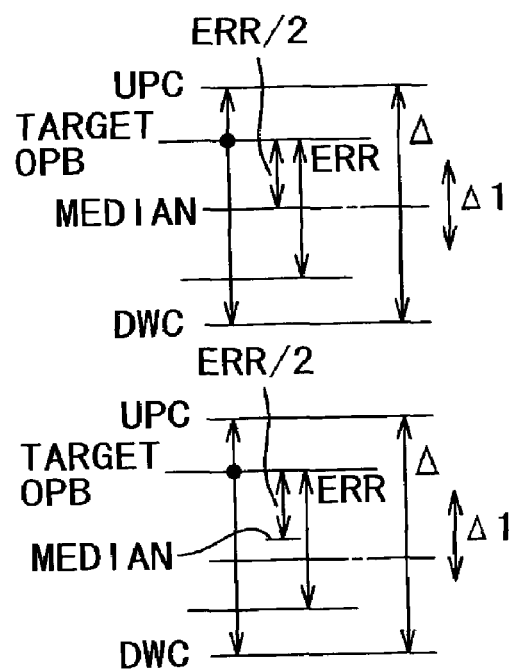

However, because the maximum and the minimum of the OPB noise themselves fluctuate in terms of probability according to the noise volume, a difference between the maximum and the minimum (=UPC−DWC) reflecting the error of the OPB level obtained in terms of the up count UPC expressing the maximum of the OPB output level and the down count DWC expressing the minimum of the OPB output level as acquired in the above-mentioned manner, does not accurately reflect the error between the median value of the actual output level (OPB output level) at the clamp position and the target OPB level which is the reference value, thus producing fluctuation according to the noise volume (see FIGS. 12A to 12C to be explained later).

Now, in a configuration of the present embodiment, the noise width (noise volume) obtained by the sum of the up count UPC and the down count DWC is put to use: by reflecting the noise width in the permissible value, the converging condition of clamp control is made to change adaptably according to the noise volume. For example, the determining circuit 426 is so controlled that the permissible value is great when the noise is great and the permissible value is small when the noise is small. Accordingly, a clamp system having a clamp precision adaptable to the noise volume and stressing stability can be realized.

Figure 11:
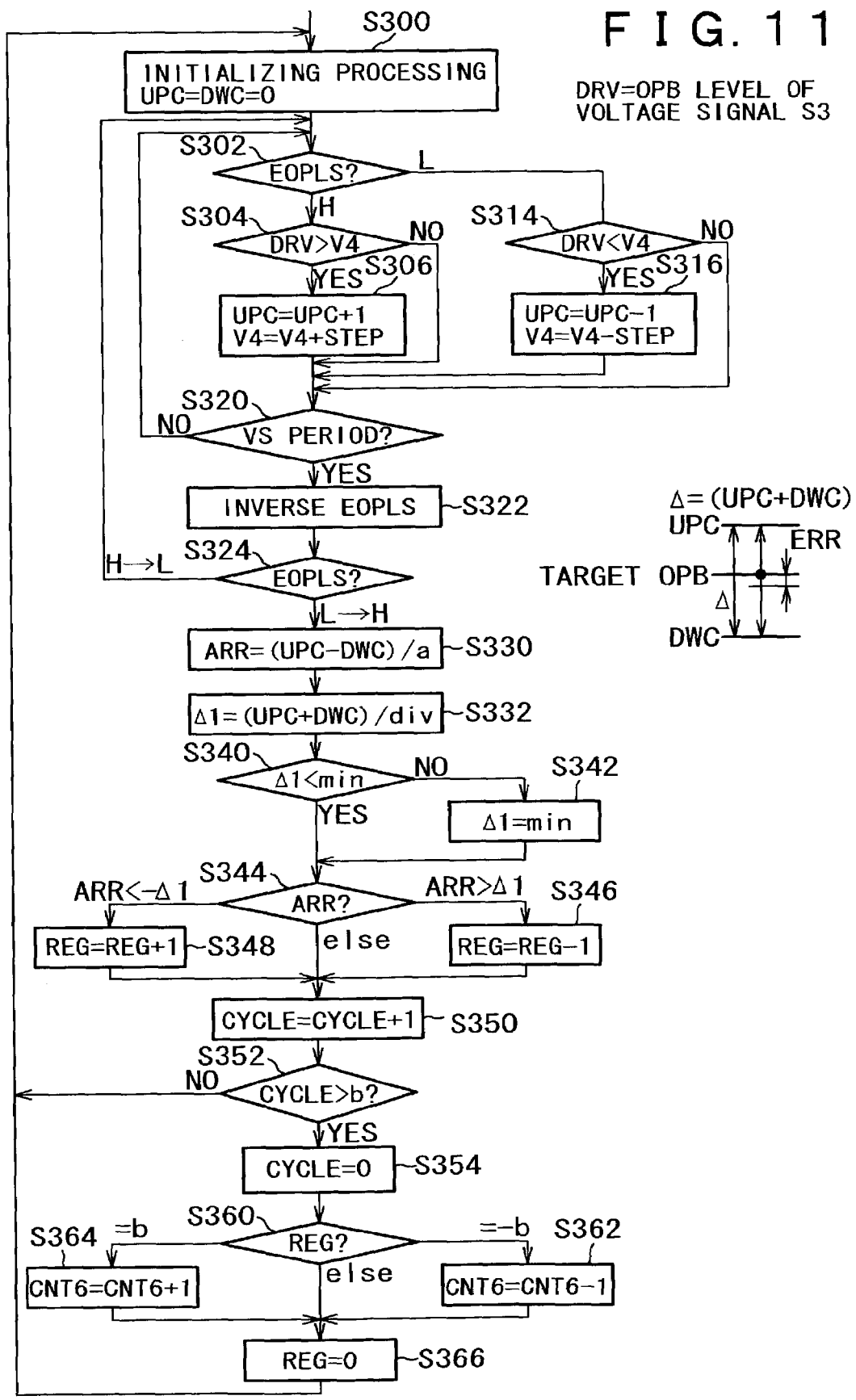
FIG. 11 is a flowchart showing an example of procedures of processing a fine clamp circuit of FIG. 10A.

FIG. 11 is a flowchart showing procedures of processing the fine clamp circuit 400 of the above-mentioned configuration. First, the fine clamp circuit 400 is initialized. For example, each of the counts UPC and DWC of the up counter 422 and the down counter 424 is reset to zero (S300), then, as mentioned above, processing of one set in two fields is performed. For example, depending on the field pulse EOPLS showing an odd field or an even field, the processing content is branched (S302). As mentioned above, during the odd field period of EOPLS="H," the up count UPC is counted by the up counter 422, while during the even field period of EOPLS="L," the down count DWC is counted by the down counter 424.

In the case of EOPLS="H," if the OPB level DRV in the voltage signal S3 is greater than the reference voltage V4 which is the comparing level (YES in S304), whenever a comparison is made by the comparator 402, the up counter 422 changes the up count UPC by "+1" (S306). Further, accompanying this, by increasing the count value CNT4 of the register counter 410 by "+1," the reference voltage V4 is increased by one step as mentioned above (S306). No action is taken when the OPB level DRV is below the reference voltage V4 (NO in S304). The fine clamp circuit 400 repeats the above-mentioned processing for each comparing pulse CP (φ2) during the field period (NO in S320). As mentioned above, the result of the up count UPC at the end of the field reflects the maximum of the OPB noise.

Likewise, in the case of EOLPS="L" (S302), if the OPB level DRV in the voltage signal S3 is smaller than the reference voltage V4 which is the comparing level (YES in S314), whenever a comparison is made by the comparator 402, the up counter 422 changes the down count DWC by "−1" (S316). Further, accompanying this, by decreasing the count value CNT4 of the register counter 410 by "−1," the reference voltage V4 is decreased by one step as mentioned above (S316). No action is taken when the OPB level DRV is above the reference voltage V4 (NO in S314). The fine clamp circuit 400 repeats the above-mentioned processing for each comparing pulse CP (φ2) during the field period (NO in S320). As mentioned above, the result of the down count DWC at the end of the field reflects the minimum of the OPB noise.

The field pulse EOPLS is arranged to alternately switch for each vertical synchronizing signal VS, and the determining circuit 406, the register counter 410, or the changeover switch 420 switches the processing content corresponding to the field pulse EOPLS interlocking with the vertical synchronizing signal VS (YES in S320, S322, and S324). And the determining circuit 426 finds a difference ERR=UPC−DWC reflecting the OPB level error upon completion of two fields, that is, at the time when the field pulse EOPLS switches from "L" to "H" at the step S324. Then, this difference ERR (noise difference) is divided by a constant a to obtain the error, ARR=(UPC−DWC)/a, thereby performing first adjustment processing (S330) with respect to the permissive value. Division may be done simply by bit shift. The significance of the first adjustment processing will be described in FIGS. 12A to 12C to be mentioned later.

Next, the determining circuit 426 acquires a sum showing the noise volume (noise width), $\Delta$=UPC+DWC. By finding a permissive value $\Delta 1$ through division of the sum $\Delta$ by a constant "div," second adjustment processing (S332) with respect to the permissive range is performed. Division may, in the same way as when the difference ERR was obtained, be simply done by bit shift. The significance of the second adjustment processing will also be described in FIGS. 12A to 12C to be mentioned later.

The determining circuit 426 further subjects the permissive value $\Delta 1$ to minimum limit processing. This means for performing the control to change the clamp level without fail when the permissive value becomes zero. Since the result is that the clamp level will not be fixed, the control is performed for the purpose of preventing it. Specifically, it is determined whether the permissive value $\Delta 1$ is below the minimum error min or not (S340). If it is below (NO in S340), its permissive value $\Delta 1$ is replaced with "min" (S342). Even when the noise width is less than the minimum error min, this makes it possible to secure positively a permissive value over a fixed range (min in the previous example).

Next, a comparison of the error APR (=(UPC−DWC)/a) with the permissive value $\Delta 1$ (=(UPC+DWC)/div) is performed by the determining circuit 426. If the error ARR is greater than the permissive value $\Delta 1$, "−1" is added to the determining register value REG (S346). What this means is that if there is an error on the plus side with respect to the clamp target value and the absolute value of the error ARR is greater than the permissive value $\Delta 1$, addition of "−1" to the count value CNT6 of the register counter 430 makes it necessary to decrease the clamp level by one step.

Further, when the error ARR is less than the minus of the permissive value $\Delta 1$, the determining circuit 426 adds "+1" to the determining register value REG (S348). What this means is that if there is an error on the minus side with respect to the clamp target value and the absolute value of the error ARR is greater than the permissive value $\Delta 1$, addition of "+1" to the count value CNT6 of the register counter 430 makes it necessary to increase the clamp level by one step.

Further, at this time, a step of changing the count value CNT6 of the register counter 430 to alter the output of the D/A converter 432 is not taken yet. It is stored in the determining register value REG, on the condition of processing that in the event of consecutive occurrences of control in the same direction for a predetermined number of times (for example, b times), a register of the D/A converter 432 is to be altered (S350 to S366). For example, if the control on the plus side to make the determining register value REG "+1" occurs consecutively b times (=b in S362), by adding "+1" to the count value CNT6 of the register counter 430, the register value of the D/A converter 432 is given "+1" (S362).

In the same manner, if the control on the minus side to add "−1" to the determining register value REG occurs consecutively b times (=−b in S362), by adding "−1" to the count value CNT6 of the register counter 430, the register value of the D/A converter 432 is given "−1" (S362). This makes it possible to enhance the accuracy with respect to the clamp level fluctuation, also leading to adjusting the frame cycle of the clamp level fluctuation.

FIGS. 12A to 12C show diagrams explaining the significance of the first adjustment processing and the second adjustment processing. When a mean of the OPB level of the up count UPC and the down count DWC obtained by discretely varying the reference voltage V4 as mentioned above, that is, when it is possible to detect uniformly with respect to the upper and lower sides of a median value of the output signal at the clamp position obtained from the up count UPC and the down count DWC, the median value of the output signal at the clamp position obtained from the up count UPC and the down count DWC correctly reflects the median value of the actual output level.

Namely, it is possible to find a displacement (clamp error) of the median value with respect to the OPB level targeted from the up count UPC and the down count DWC. Consequently, when the negative feedback control is applied so that the error AER obtained from the up count UPC and the down count DWC becomes zero, it is considered possible to fit accurately the potential of the clamp position of the output signal to the target OPB level.

These considerations notwithstanding, actually, the up count UPVC and the down count DWC may not always be detected uniformly with respect to the mean of the OPB level, since the up count UPC and the down count DWC are detected discretely and in terms of probability, and as shown in FIG. 12A, it fluctuates in terms of probability according to the noise volume. Hence, the difference ERR (=UPC−DWC) acquired from the up count UPC and the down count DWC and the error APP (=(UPC−DWC)/a) of the OPB level obtained by dividing it by "a" do not represent the values accurately reflecting the median value of the actual output level at the clamp position, thus carrying fluctuation according to the noise volume.

Namely, the median level between UPC and DWC is originally equal to the median value of the output voltage at the clamp position, while, in actuality, it is not equal in some cases. It is thus difficult to find the median value accurately from UPC and DWC. Consequently, it is not possible to fit the potential at the clamp position of the output signal to the target OPB level by applying the negative feedback control so that the obtained error AER becomes zero. Rather, instability due to noise is more of a problem. This point is taken into consideration in the above-mentioned procedures of processing (steps S330 to S346), and control processing which takes account of noise is employed.

Further, during the converging process, instead of noise width, the pull-in operation from a displaced state is performed. For example, as shown in FIG. 12B, an operation to pull in the target OPB level from the displaced state on the plus side is performed. In this state, the DWC cannot be obtained for processing to shift the reference potential V4 to the minus side as in step S314 processing mentioned above, whereas a value as it is reset (i.e., zero) is being held.

Though not illustrated, conversely, during the process in which an operation to pull in the target OPB level from the displaced state on the minus side is performed, the UPC cannot be obtained in the processing to shift the reference potential V4 to the plus side as in step S304 processing mentioned above, and a value as it is reset (i.e., zero) is held.

In this manner, during the converging process from the state of being apart from the target to some extent, for example, DWC1=DWC will not hold. Since the original noise width cannot be acquired, the error ARR (=(UPC−DWC)/a) obtained in the above-mentioned step 330 becomes equal to the permissive value Δ1 (=(UPC−DWC)/div) obtained in step S332 in terms of their size (absolute value). Consequently, if it is assumed that the divisor a and the divisor div are equal, an "else" route is established in step S344, so that no clamp operation is performed.

To avoid this, in actual practice, the divisor a and the divisor div are set so as to maintain a relationship of the divisor a<the divisor div. Further, in step S344, based on a relationship between the error ARR and the permissive value Δ1 and on the noise volume, the converging operation is stopped. Hence, in consideration of the noise width Δ (=UPC+DWC), the divisor a and the divisor div are set. It should be pointed out that inasmuch as the relationship of the divisor a<the divisor div is to be maintained, the divisor a is set as "1" with no division actually performed, and that the noise width Δ may be divided by a value greater than "1." For example, a bit shift may be made to the low bit side with regards to only the noise width Δ. In addition, it is not confined to setting a fixed divisor at all times in the above-mentioned processing, but these values may be changed dynamically in the converging process.

In this way, as the output signal level of the clamp position is made to converge to the target OPB level, soon, as FIG. 12C shows, a status of DWC1=DWC is produced, making it possible to find the original noise width. But, even in this condition, since the up count UPC and the down count DWC can be detected discretely and in terms of probability, it is not always possible that as regards the up count UPC and the down count DWC, the upper and lower sides can be uniformly detected with respect to the mean of the OPB level.

Consequently, as shown in FIG. 12C, the noise difference ERR (=UPC−DWC) and the error ARR (=(UPC−DWC)/a) of the OPB level which is found by dividing it by "a" does not reflect the clamp error accurately. Therefore, even if the negative feedback is applied to enable the error ARR to become zero, it is not possible to fit the median value of the actual output level at the clamp position accurately to the target OPB level. Nevertheless, as mentioned above, so long as the divisors a and div are in the relationship of the divisor a<the divisor div, the converging operation continues.

In other words, the displacement in the positive direction relating to the target OPB level is acquired as the up count UPC by the processing of steps S304 and S306, while the displacement in the negative direction relating to the target OPB level is acquired as the down count DWC by the processing of steps S314 and S316. Then, by means of obtaining the error ARR of the clamp interval relating to the target OPB level, which is the reference value of clamp operation, and the permissive value Δ1 based on the up count UPC corresponding to the displacement in the positive direction and the down count DWC corresponding to the displacement in the negative direction, it is possible to control to permit the median value at the clamp position of the output signal to approach approximately to the target OPB level.

It should be noted that the median value of the clamp position=the target OPB+ERR/2. In the above-mentioned processing, no processing has been executed to find directly the median value at the clamp position of the output signal, but the use of the above-mentioned procedures is tantamount to carrying out the control processing such as finding essentially the median value or a value equivalent to the median value and changing the converging condition so that such median value approaches the target OPB level. Naturally, it goes without saying that processing actually to find the value which is the median value at the clamp position=target OPB+ERR/2 and change the converging condition accordingly may be performed.

FIGS. 13A to 13D show diagrams explaining detailed examples of steps S330 to S366 in the above-mentioned procedures of processing. In this context, the permissive value Δ1=(UPC+DWC)/div is the same for all cases.

Figure 13A:
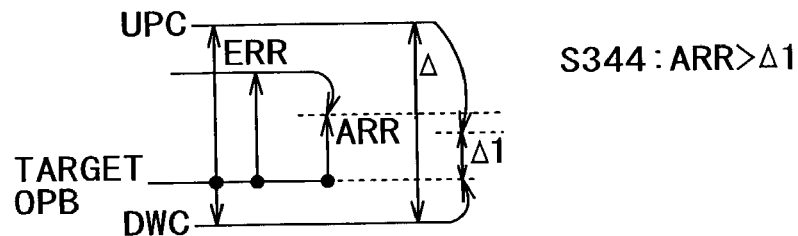
FIGS. 13A to 13D show diagrams showing a detailed example of steps S330-S366 in the procedures of processing in FIG. 11.

A condition shown in FIG. 13A refers to a case where with respect to the target OPB level (clamp target value), the signal level of the clamp position in the voltage signal S3 has an error on the plus side and the absolute value of the error ARR is greater than the permissive value Δ1. In this case, REG=REG−1 is in step S348, whereas should this continue for a predetermined number of times (b times in the previous example), the clamp level is decreased by one step by adding "−1" to the count value CNT6 of the register counter 430 in step S362. Since this enables the D/A converter 432 to generate such a voltage as to decrease the clamp level, the OPB level in the voltage signal S3 approaches the clamp target value.

Figure 13B:
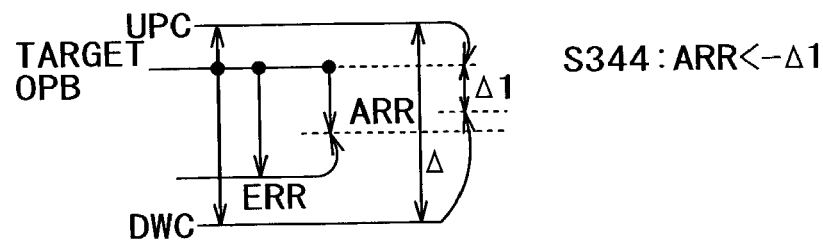

A condition shown in FIG. 13B refers to a case where relating to the target OPB level (clamp target value), the signal level of the clamp position in the voltage signal S3 has an error on the minus side and the absolute value of the error ARR is greater than the permissive value Δ1. In this case, REG=REG+1 is in step S346, whereas should this continue for a predetermined number of times (b times in the previous example), the clamp level is increased by one step through an addition of "+1" to the count value CNT6 of the register counter 430 in step S364. Since this enables the D/A converter 432 to generate such a voltage as to increase the clamp level, as a result, the OPB level in the voltage signal S3 approaches the clamp target value.

Figure 13C:
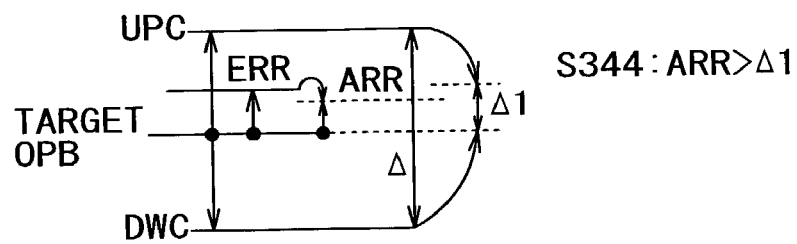

A condition shown in FIG. 13C refers to a case where relating to the target OPB level (clamp target value), the signal level of the clamp position in the voltage signal S3 has an error on the plus side but the absolute value of the error ARR is less than the permissive value Δ1. This is a case that occurs when the signal level of the clamp position in the voltage signal S3 approaches the target OPB level to such an extent as to make it unnecessary to change the clamp potential. In this case, no action is taken either after determination in step S344 (ELSE in S344) or after determination in step S360 (ELSE in S360). As a result, the signal level of the clamp position in the voltage signal S3 is retained at the clamp potential at that point in time.

Figure 13D:
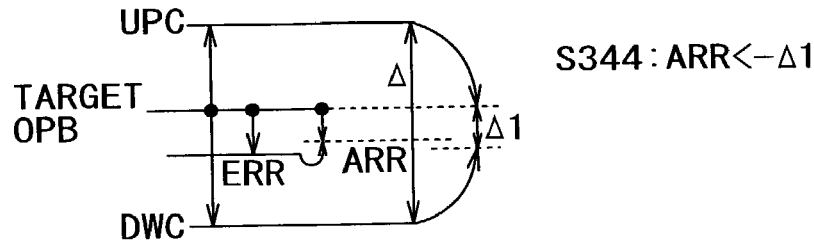

A condition shown in FIG. 13D refers to a case where relating to the target OPB level (clamp target value), the signal level of the clamp position in the voltage signal S3 has an error on the minus side but the absolute value of the error ARR is less than the permissive value Δ1. This is a case that occurs when the signal level of the clamp position in the voltage signal S3 approaches the target OPB level to such an extent as to make it unnecessary to change the clamp potential. In this case, too, no action is taken either after determination in step S344 (ELSE in S344) or after determination in step S360 (ELSE in S360). As a result, the signal level of the clamp position in the voltage signal S3 is retained at the clamp potential at that point in time.

As apparent from FIG. 13A to FIG. 13D above, according to the procedures of processing of a preferred embodiment mentioned above, even if the absolute value Δ1=(UPC+DWC)/div corresponding to the detected noise width Δ is the same, the condition imposed by the negative feedback control to eliminate the error relating to the clamp target value differs. For example, it is possible for the error ARR produced by the up count UPC and down count DWC not to be accurate, but it represents, at least, a value reflecting the difference between the output signal level at the lamp position and the target OPB level, that is, the clamp error.

Hence, in the case of the clamp error relating to the clamp target value being greater than the permissive value, the negative feedback operates so as to eliminate the clamp error (cases in FIG. 13A and FIG. 13B). On the other hand, should the clamp error relating to the clamp target value be less than the permissive value, the negative feedback such as to eliminate the clamp error does not operate (cases in FIG. 13A and FIG. 13D). Unless the noise width Δ is great to a certain extent, no negative feedback goes into action.

By the way, in the above-mentioned processing, since the permissive value Δ1 is set corresponding to the noise volume (noise width Δ) in such a manner as the permissive value Δ1=Δ/div, the converging condition of the clamp operation is dynamically switched corresponding to the noise volume. In other words, it can be so arranged that when the noise volume (noise width Δ) is great, it is interlinked with operating the negative feedback only when there is a large clamp error, and that when the noise volume (noise width Δ) is small, it is interlinked with operating the negative feedback even in spite of a small clamp error.

Further, it can be said that the sensitivity of the clamp operation and the negative feedback gain are dynamically switched corresponding to the noise volume (noise width Δ) in such a way that when the noise volume (noise width Δ) is small, the sensitivity of the clamp operation is made larger (a negative feedback gain is enlarged) and when the noise volume (noise width Δ) is large, the sensitivity is made smaller (a negative feedback gain is reduced). And the permissive value Δ1 regulates the insensitive zone and the converging condition of the negative feedback. This permissive value Δ1 dynamically changes corresponding to the noise volume. In the second adjustment processing, that the noise width Δ is divided by the divisor div indicates the establishment of the degree of reference relating to the noise volume of the converging condition and the insensitive zone.

Furthermore, according to the above-mentioned processing, by varying consecutively the converging condition that matches the noise volume makes it possible to realize the OPB clamp, a converging algorithm having noise resistance in terms of stability can be set.

Incidentally, in the event that the noise volume (noise width Δ) becomes very close to zero, or completely zero, there is a possibility that the sensitivity and the negative feedback gain essentially grow to make it impossible to fix the clamp level as a result. For the purpose of preventing it, if the permissive value Δ1 is less than the minimum error min, that permissive value Δ1 is replaced with "min,", whereby even if the noise volume (noise width Δ) is small, a certain degree of an insensitive zone is set, thus enhancing noise resistance.

Further, in the fine clamp circuit 400 of the present embodiment, too, while a high-precision A/D converting circuit is not necessary, it is possible to configure a circuit system enabling a highly noise-resistant, stable, and high-precision clamp level to be fixed essentially with a 1-bit A/D converting circuit alone.

Still further, as in the previous case of a processing circuit, the processing circuit (logic unit) of the present embodiment can be configured with several counters and only a comparatively simple determining circuit, hence, it is possible to integrate a whole system including a 1-bit A/D converting circuit and a D/A converter upon the same substrate as the solid state imaging device 3.

As explained above, according to each preferred embodiment mentioned above, independently of the A/D converter 28 for signal processing, a low resolution A/D converting section such as a 1-bit A/D converting circuit utilizing an analog comparator is provided, whereas using this section as well as a digital processing circuit to configure a circuit computing and holding a clamp level of high gray-scales in digital value, it is possible to realize high-precision clamp control with no need of high-precision A/D conversion or D/A conversion.

For example, in the case of a multi-bit A/D converter for signal processing with a high sampling frequency (pixel clock equivalent in case of a clamp for image device), a frequency of digital noise generated also becomes high, whereas according to the configuration of the present preferred embodiment, by setting up a low resolution A/D converting circuit exclusively for digitalizing the clamp level independently of the A/D converter for signal processing, it is possible to use a sampling frequency lower than the frequency for the signal processing, thus abating the noise problem. Accordingly, even though integrating the clamp circuit of the digital type on the same substrate as the solid state imaging device, a concern that the volume of noise generated may pose a problem can be abated.

Further, by setting up a plurality of clamp circuits having different bit resolutions, it is possible to realize a clamp circuit of the digital type with no occurrence of problems of noise as well as circuit size. For example, by controlling two D/A converters, one having low gray-scales, a wide dynamic range, and low precision for each gray-scale, and the other having a medium level wedge tone, a narrow dynamic range, and high precision for each gray-scale, it is possible to configure a clamp circuit having a high precision clamp level while compensating for a wide dynamic range and requiring no high precision D/A converter.

Still further, through consecutive changes of converging conditions to match the noise volume, for example, controlling in such a way that when noise is large, the permissive value is large, and when noise is small, the permissive value is small, it is possible to control whether the negative feedback control is to be operated or not according to the noise volume. It is also possible to realize a clamp system having a clamp precision adaptable to the noise volume with emphasis on stability.

Furthermore, in combination with the solid state imaging device of the current output type, the use of a clamp circuit for stabilizing the DC level of an imaging signal for the clamp circuit of the current feedback type contributes to dispensing with a voltage adder and a capacity device to perform a DC component cut which formed a requirement in the case of a conventional configuration of the voltage feedback type. Consequently, a simple feed back of the signal current to the clamp current enables the DC clamp to stabilize the DC level of the output signal, resulting in decreasing the number of parts as well as the number of circuits for the signal to pass, whereby the mixing of noise is abated.

Moreover, the circuit itself to which the clamp current is fed can be simply formed by using the constant-current characteristic of a MOS transistor, thus contributing to simplifying the system and reducing the number of devices. Namely, in combination with the solid state imaging device of the current output type, by making a voltage operating point setting section, a current sampling section or a clamp interval all in terms of configuration of the current operating type, it is possible to use, as an imaging device, a solid stage imaging device of an integral type itself, in which a voltage signal detecting section and a clamp interval are formed on the same semiconductor substrate as the imaging section (light receiving section/pixel section). This is a highly convenient feature and advantage.

Further, a CDS circuit and a VGA circuit, too, are of configuration to perform signal processing of the current type. By combining these with the clamp interval of the current feedback type, when processing a signal in a limited power voltage, there is an advantage of securing a dynamic range of a circuit more easily than by processing with a voltage signal.

Take either case of the start-up mode and the normal mode. While the feedback amount of the clamp voltage is set in terms of 1LSB unit, it is not limited to this. For example, the greater a difference with the reference value is, the more number of steps may be taken. Further, it may be so arranged to take more number of steps in the start-up mode.

Further, in normal mode, the reference voltage is changed to plus or minus for a predetermined width for each comparing pulse CP (see FIG. 8B), but it does not necessarily need to switch for each comparing pulse CP. For example, it may be alternately switched in terms of several pulse rates. Also, it may be so arranged that a particular continuing pulse rate at the time of switching to the positive side may be made different from the continuing pulse rate at the time of switching to the negative side.

Still further, while the circuit shown in FIG. 10A is described as applicable to the fine clamp circuit 400, the same circuit may be applied to the coarse clamp circuit 301 as well.

Furthermore, in the above-mentioned preferred embodiments, there is described a configuration of the clamp circuit of the current feedback type that realizes the clamp operation in current mode. Not only this configuration but also other configuration of the voltage feedback type may be employed utilizing a voltage adder, a capacitance device for eliminating the DC component and the like in the same way as the conventional clamp circuit. In this case, what is required is to change the current adding section 280 to the voltage adding section or the like, and the current-voltage converting section 220 is removed accordingly.

Moreover, in the above-mentioned preferred embodiments, for specific examples of the current signal detecting section 5 for performing the CDS function in current mode, the use is made of a configuration of the first or the sixth preferred embodiment disclosed in Japanese Patent Application No. 2002-102108 assigned to the present applicant. However, it is not limited to the above embodiment, and configurations of other preferred embodiments disclosed in Japanese Patent Application No. 2002-102108 may be employed. Naturally, it is not limited to the configuration examples disclosed in Japanese Patent Application Publication No. 2002-102108. So long as the configuration is such as to convey signals acquired in the solid state imaging device 3 to the current clamp section 26 side in current signals, it remains within the scope of the present invention. For example, the use may be made in combination with an FPN suppression circuit (CDS circuit) utilizing a current copier of two-cell construction proposed in an article, "On-Focal-Plane Signal Processing for Current-Mode Active Pixel Sensors," in the IEEE TRANSACTIONS ON ELECTRON DEVICE, VOL. 44, No. 10.

Further, in the above-mentioned preferred embodiments, description is made of an example of configuring by using a MOS transistor, a voltage operating point setting section, a current sampling section or a current feedback section to feed a clamp current to an imaging signal. Nonetheless, there may be employed a configuration utilizing a junction type FET or a bipolar transistor.

Additionally, in the above-mentioned preferred embodiments, an area sensor in which a photosensitive section is arranged in the form of matrix (two dimensional form) is presented for explanation, but it is not limited to this example. It may also be a line sensor.

Now, it goes without saying that each device in the current signal detecting section 5 can be modified to what is complementary to these.

As mentioned above, according to the present invention, as an D/D converting section to digitalize the clamp level, independently of an A/D converter for signal processing, a coarse A/D converting section is provided, enabling a comparatively low sampling frequency to be used, thus abating the problem of digital noise. Hence, a clamp circuit of the digital type causing no problem of digital noise and circuit volume can be configured. This also makes it possible for the clamp circuit of the digital type to be integrated on the same substrate as the solid imaging device.

Also, if there is employed a configuration that performs switch control of a plurality of modes having different operating speeds and sensitivities with respect to the fluctuation of the clamp level, then it is possible to provide diametrically opposed features of high-speed pull-in and stability to noise, whereby the clamp level can be rapidly converged to a fixed value with respect to the sharp fluctuation of the clamp level while the noise-caused clamp level fluctuation can be held down by restraining the sensitivity in a stability state.

Moreover, if there is employed a configuration that performs switch control of a plurality of kinds of clamp circuits having different bit resolutions, then it is possible to realize high-precision clamp control without requiring high-precision A/D conversion and D/A conversion.

While the present invention has been particularly shown and described using preferred embodiments, a technical range thereof is not limited to the range described in the preferred embodiments mentioned above. Various alterations or modifications may be added to the above-mentioned preferred embodiments within a scope not departing from the aspect of the invention, and any embodiment subjected to such change or modification thereof shall be included in the technical range.

Further, the above-mentioned preferred embodiments are not intended to limit the invention as claimed. Further, all the combinations of the characteristics described in the preferred embodiments are not necessarily essential for resolving means of the invention. The preferred embodiments mentioned above include the invention in a variety of stages, hence, diverse inventions may be extracted through proper combinations of a plurality of configuration elements as disclosed. Even if several configuration elements should be deleted from all configuration elements as shown in the preferred embodiments, so long as viable effect is delivered, a configuration with such several configuration elements deleted may be extracted as the invention.

What is claimed is:

1. A dc level control method for holding a dc level of a clamp portion in an electric signal to be a prescribed value comprising the steps of:
    comparing a dc level of a sampling interval in said electric signal with a predetermined reference value to obtain a difference between said dc level and said reference value using an A/D converting section for analog to digital dc level comparison which has a lower bit resolution than an A/D converting section for digital signal processing of said electric signal; and
    feeding back a clamp signal to said electric signal so that said obtained difference between said dc level and said reference value substantially becomes zero.

2. The dc level control method as cited in claim 1, wherein said A/D converting section for dc level comparison is set to be a first mode wherein, said clamp signal is fed back to said electric signal based on a first sampling pulse which is lower than a sampling pulse used in said A/D converting section for digital signal processing of said electric signal until said obtained difference between said dc level and said reference becomes within a predetermined range, and
    said A/D converting section for dc level comparison is set to be a second mode wherein, a sensitivity for a fluctuation of said dc level is set to be lower than a sensitivity in said first mode, and said clamp signal is fed back to said electric signal based on a second sampling pulse which is lower than the sampling pulse used in said A/D converting section for digital signal processing of said electric signal after said obtained difference between said dc level and said reference becomes within a predetermined range.

3. The dc level control method as cited in claim 1, further comprising the steps of:
    obtaining a displaced amount in a positive direction of the dc level relative to the reference level of said clamp interval during a predetermined interval based on a sampling pulse lower than a sampling pulse used in the A/D converting section for digital signal processing;
    obtaining a displaced amount in a negative direction of the dc level relative to the reference level of said clamp interval during a predetermined interval based on said lower sampling pulse;
    obtaining a noise condition included in said clamp interval based on said obtained displaced amount in a positive direction and the displaced amount in a negative direction; and
    controlling the feedback of said clamp signal to said electric signal with reference to said obtained noise condition.

4. A clamp circuit for holding a dc level of a clamp portion in an electric signal to be a prescribed value, comprising: an A/D converting section for analog to digital dc level comparison having a lower bit resolution than an A/D converting section for A/D signal processing of said electric signal; and
    a feedback section for obtaining, by comparing a dc level of a sampling interval in said electric signal with a predetermined reference value, a difference between said dc level and said reference value and for feeding back a clamp signal to said electric signal so that said obtained difference between said dc level and said reference value becomes approximately zero.

5. The clamp circuit as cited in claim 4, wherein said feedback section comprises:
    a first mode operating section for feeding back said clamp signal to said electric signal based on a first sampling pulse lower than a sampling pulse used in an A/D converting section for digital signal processing;

a second mode operating section for feeding back said clamp signal to said electric signal based on a second sampling pulse lower than a sampling pulse used in an A/D converting section for digital signal processing, while a sensitivity to a fluctuation of said dc level is lower than said first mode, and a mode switching section for operating said first mode operating section until said obtained difference between said dc level and reference value becomes within a predetermined range, and for switching so as to operate said second mode operating section after said obtained difference between said dc level and reference value is converged within said predetermined range.

6. The clamp circuit as cited in claim 5, wherein said first mode operating section compares said dc level with said reference value at every said first sampling pulse, and changes digital data designating said clamp signal by a predetermined step in a direction to reduce the difference between said dc level and said reference value.

7. The clamp circuit as cited in claim 6, wherein said first mode operating section shifts said dc level to the direction to be equal to said reference value by continuously changing said clamp signal by said predetermined step in a direction to reduce the difference between said dc level and said reference value, and said mode switching section switches to operate said second mode operating section, as said difference between said dc level and said reference value are converged within a predetermined range when the direction for reducing the difference between said dc level and said reference value is altered almost at every said first sampling pulse.

8. The clamp circuit as cited in claim 7, wherein said mode switching section switches to operate said second mode operating section when the number of changes of the direction for reducing said difference between said dc level and said reference value becomes a predetermined number.

9. The clamp circuit as cited in claim 5, wherein said second mode operating section determines high or low of said dc level and said reference value at every third sampling pulse which is faster than said second sampling pulse and slower than said first sampling pulse used in said A/D converting section for digital signal processing;

counts the number of the high or low; and feeds back a clamp signal to said electric signal based on said second sampling pulse so that the difference between said dc level and said reference value becomes about zero when one of counted number of high or low reaches a predetermined number.

10. The clamp circuit as cited in claim 9, wherein said second mode operating section changes said clamp signal by a predetermined amount at every predetermined number of said third sampling pulses in a positive/negative direction with said reference value as a center.

11. The clamp circuit as cited in claim 4, wherein said A/D converting section for dc level comparison includes a reference value setting section for setting a predetermined reference value and, a comparing section for comparing said reference value set by said reference value setting section with a dc level in said sampling interval of said electric signal, and further includes a control section for switching said reference value setting section and said comparing section to be a standby mode except said sampling interval.

12. An imaging apparatus comprising:

a solid state imaging device for taking an image;

a first A/D converting section for processing an imaging signal of said image from said solid state imaging device into a digital signal; a second A/D converting section for analog to digital dc level comparison having a lower bit resolution than said first A/D converting section; and a feed back section for feeding back a clamp signal to said imaging signal by comparing a dc level of a sampling interval in said imaging signal with a predetermined reference value by said second A/D converting section so that a difference between said dc level and said reference value becomes around zero.

13. The imaging apparatus as cited in claim 12, wherein said feed back section comprises:

a first mode operating section for feeding back said clamp signal to said imaging signal based on a comparing pulse which is a first sampling pulse lower than a second sampling pulse used in said first A/D converting section and corresponds to an optical black pixel in a horizontal scanning direction of said solid state imaging device;

a second mode operating section having a lower sensitivity to a deviation of said dc level than a sensitivity of said first mode operating section for feeding back said clamp signal to said imaging signal based on a pulse that is slower than said first sampling pulse and defining a vertical scanning of said solid state imaging device; and a mode switching section for switching to operate said first mode operating section until a difference between said dc level and said reference value becomes within a predetermined range, and to operate said second mode operating section after said difference between said dc level and said reference value becomes within a predetermined range.

14. The imaging apparatus as cited in claim 13, wherein said second mode operating section determines high or low of said dc level of said optical black pixel and said reference value at every comparing pulse which corresponds to said optical black pixel in a horizontal scanning direction of said solid state imaging device and is slower than a sampling pulse used in an A/D converting section for signal processing;

counts the number of the high or low; and feeds back a clamp signal to said electric signal based on a pulse defining a start of a vertical scanning of said solid state imaging device so that the difference between said dc level and said reference value becomes about zero when one of counted number of high or low reaches a predetermined number.

15. A clamp circuit comprising an A/D converting section; wherein said A/D converting section obtains, by comparing a dc level during sampling interval in an electric signal and a reference value, a difference between said dc level and said reference value, using said A/D converting section for analog to digital dc level comparison which has a lower bit resolution than an A/D converting section for digital signal processing of said electric signal and feeds back said clamp signal to said electric signal so that obtained difference between said dc level and said reference value is reduced.

16. An image taking apparatus comprising:
a solid state imaging device;
an A/D converting section for analog to digital dc level comparison having a lower bit resolution than an A/D converting section for A/D signal processing of said electric signal; and
a feedback section for obtaining, by comparing a dc level during a sampling interval in an image taking signal from said solid state imaging device with a reference value, a difference between said dc level and said reference value and feeding back said clamp signal to said image taking signal so that said obtained difference between said dc level and said reference value is reduced.

17. The image taking apparatus as cited in claim 16, wherein
said image taking device includes a plurality of section pixels each having at least a photoelectric device and a transistor for amplification,
said image taking signal is outputted from said solid state imaging device as a signal current by converting a signal charge from said photoelectric device in said transistor for amplification, and
said clamp signal is fed back to said signal current before current-voltage conversion.

* * * * *